US012621036B2

(12) United States Patent
Ly et al.

(10) Patent No.: US 12,621,036 B2
(45) Date of Patent: May 5, 2026

(54) SPATIAL DOMAIN TRANSMISSION RELATION CONSIDERATIONS FOR SHARED CHANNEL REPETITIONS

(71) Applicant: QUALCOMM INCORPORATED, San Diego, CA (US)

(72) Inventors: Hung Dinh Ly, San Diego, CA (US); Kexin Xiao, Shanghai (CN); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 18/253,890

(22) PCT Filed: Jan. 15, 2021

(86) PCT No.: PCT/CN2021/072036
§ 371 (c)(1),
(2) Date: May 22, 2023

(87) PCT Pub. No.: WO2022/151318
PCT Pub. Date: Jul. 21, 2022

(65) Prior Publication Data
US 2024/0007170 A1     Jan. 4, 2024

(51) Int. Cl.
*H04B 7/06*       (2006.01)
*H04B 7/0408*     (2017.01)
*H04W 74/08*      (2024.01)

(52) U.S. Cl.
CPC ....... *H04B 7/06952* (2023.05); *H04B 7/0408* (2013.01); *H04W 74/08* (2013.01)

(58) Field of Classification Search
CPC .. H04B 7/06952; H04B 7/0408; H04W 74/08
See application file for complete search history.

(56) References Cited

U.S. PATENT DOCUMENTS

2019/0319823 A1    10/2019   Akkarakaran et al.
2020/0396744 A1    12/2020   Xiong et al.
(Continued)

FOREIGN PATENT DOCUMENTS

| CN | 108347789 A | 7/2018 | |
| CN | 110536450 A | 12/2019 | |
| CN | 113099547 A | 7/2021 | |
| CN | 114071778 A * | 2/2022 | .......... H04W 74/006 |
| WO | WO-2020221318 A1 | 11/2020 | |

OTHER PUBLICATIONS

3GPP TR 38-830 V1.0.0: "3rd Generation Partnership Project; Technical Specification Group Radio Access Network; Study on NR coverage enhancements (Release 17)", 3rd Generation Partnership Project (3GPP), Mobile Competence Centre, 650, Route Des Lucioles, F-06921 Sophia-Antipolis Cedex, France, Nov. 29, 2020, XP051960456, pp. 1-93.

(Continued)

*Primary Examiner* — Harry H Kim
(74) *Attorney, Agent, or Firm* — Holland & Hart LLP

(57) ABSTRACT

Methods, systems, and devices for wireless communications are described. A user equipment (UE) may initiate a random access procedure with a base station. The UE may transmit a random access channel (RACH) preamble to the base station. The UE may receive, from the base station and in response to the RACH preamble, a random access response (RAR) message. The UE may then identify a beam configuration for transmission of repetitions of an uplink transmission response to the RAR message. The UE may then transmit the repetitions of the uplink transmission using one or more beams in accordance with the beam configuration.

42 Claims, 19 Drawing Sheets

600

(56)    References Cited

U.S. PATENT DOCUMENTS

| 2022/0046623 | A1* | 2/2022 | Xiong | H04L 1/1819 |
| 2022/0046716 | A1 | 2/2022 | Chai et al. | |
| 2023/0156809 | A1* | 5/2023 | Xu | H04L 1/189 |
| | | | | 370/329 |
| 2023/0262753 | A1* | 8/2023 | Axnäs | H04L 1/189 |
| | | | | 370/329 |
| 2024/0236874 | A1* | 7/2024 | Zhang | H04B 7/0408 |

OTHER PUBLICATIONS

Moderator (ZTE Corporation): "Feature Lead Summary#2 on Coverage Enhancement for Channels Other Than PUSCH and PUCCH", 3GPP Draft, 3GPP TSG RAN WG1 #103-e, R1-2009805, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 19, 2020, 119 Pages, XP051955961, pp. 36 50.
Supplementary European Search Report—EP21918526—Search Authority—The Hague—Sep. 16, 2024.
International Search Report and Written Opinion—PCT/CN2021/072036—ISA/EPO—Oct. 21, 2021.
ZTE Corporation: "Discussion on Potential Techniques for Channels other than PUSCH and PUCCH", 3GPP Draft, 3GPP TSG RAN WG1 #103-e, R1-2007745, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020 Oct. 17, 2020 (Oct. 17, 2020), XP051939885, 14 Pages.

* cited by examiner

Repetitions <u>315</u>

Beam <u>310-a</u>

Msg3 <u>305-a</u>

Msg3 <u>305-b</u>

Msg3 <u>305-c</u>

Msg3 <u>305-d</u>

300

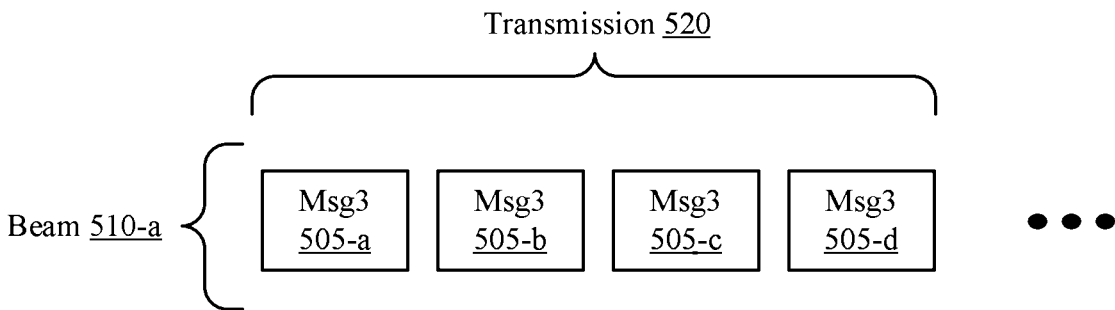
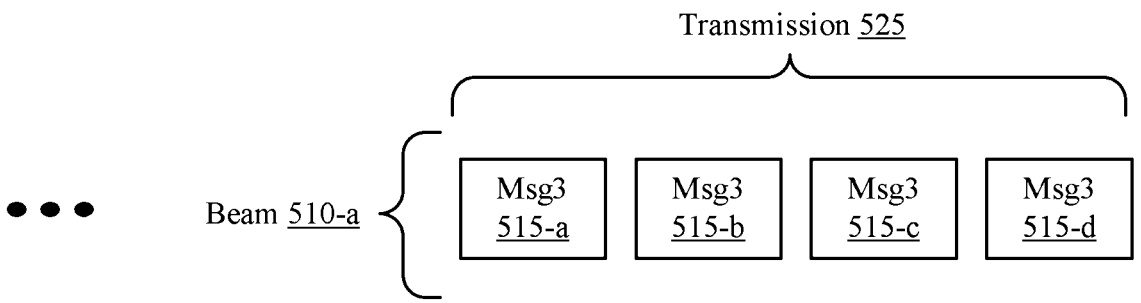
FIG. 5

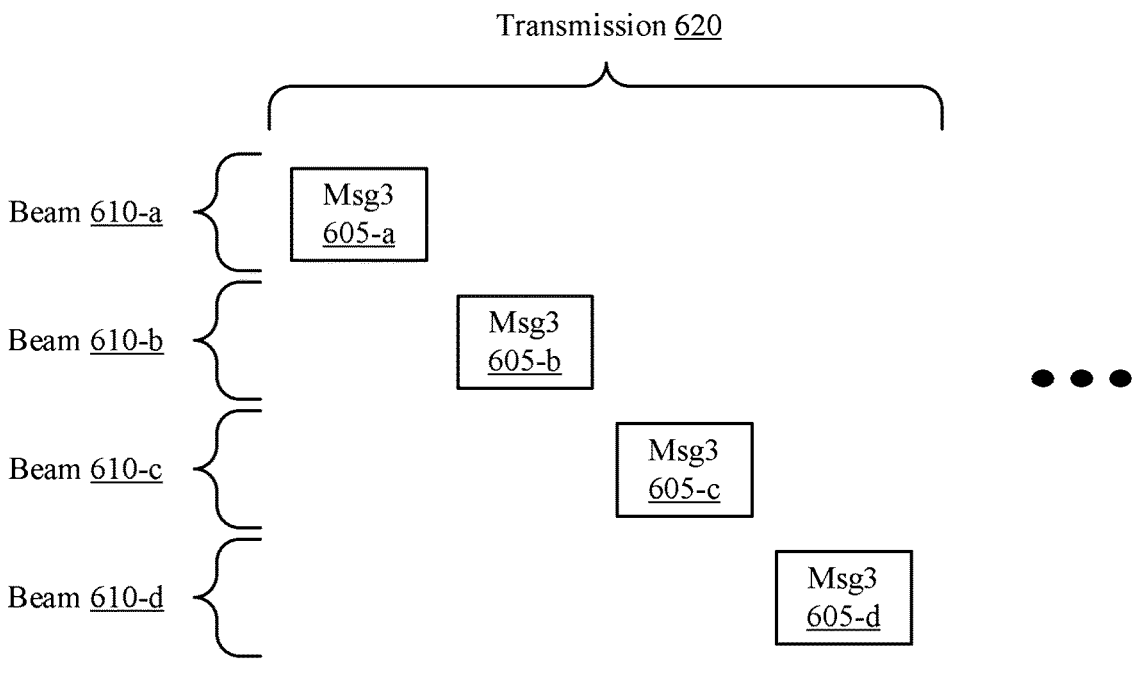
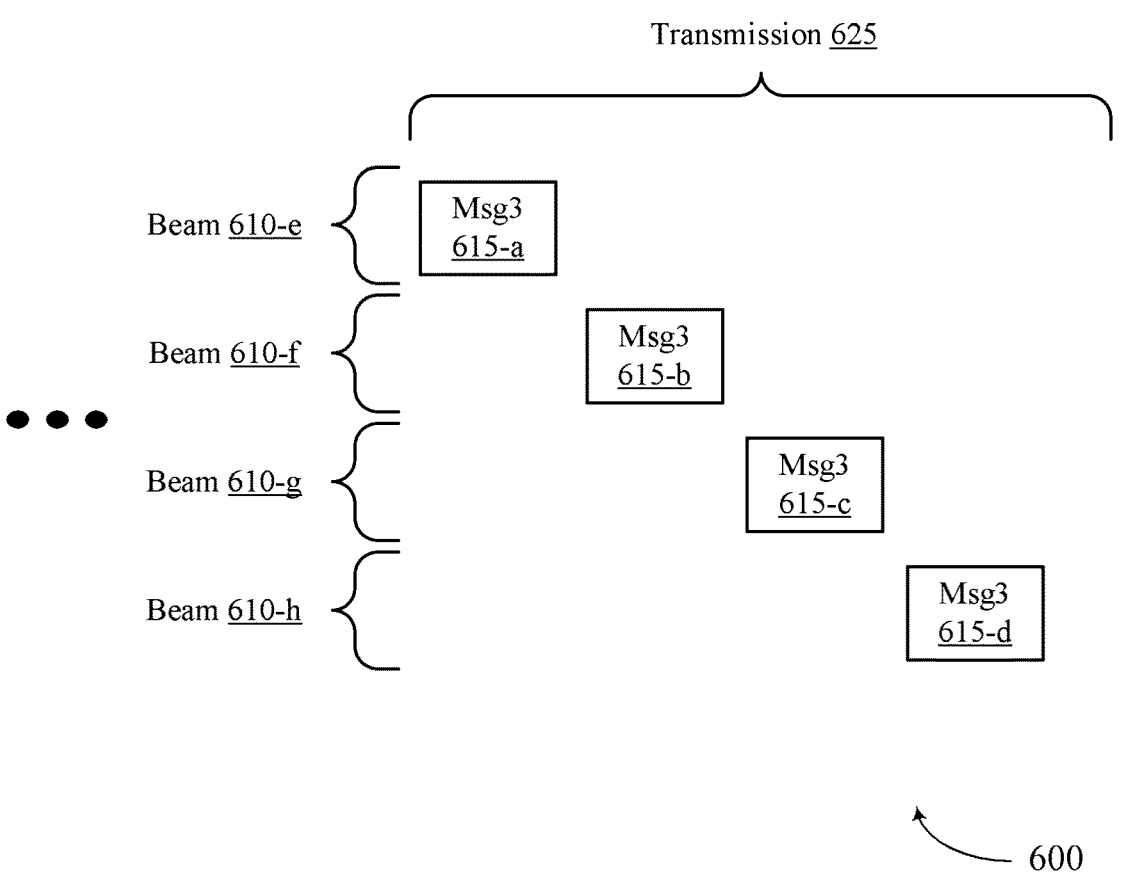
FIG. 6

115-b 105-b

705    RACH Preamble

RAR Message    710

DCI Message    715

720    Identify Beam Configuration

725    Repetitions

700

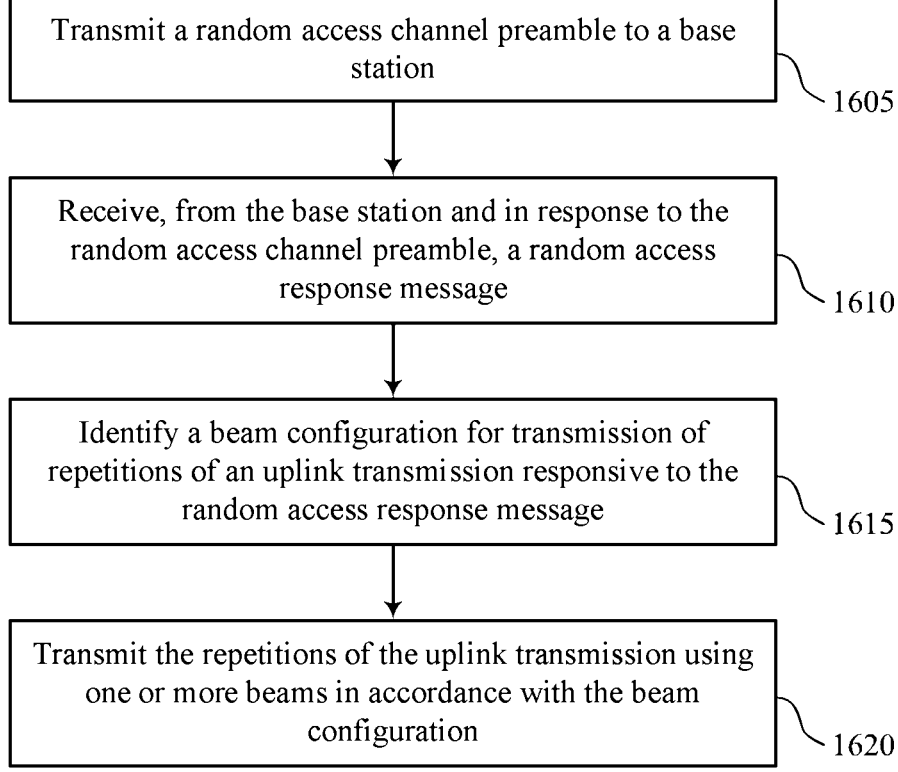

Transmit a random access channel preamble to a base station 〜 1605

Receive, from the base station and in response to the random access channel preamble, a random access response message 〜 1610

Identify a beam configuration for transmission of repetitions of an uplink transmission responsive to the random access response message 〜 1615

Transmit the repetitions of the uplink transmission using one or more beams in accordance with the beam configuration 〜 1620

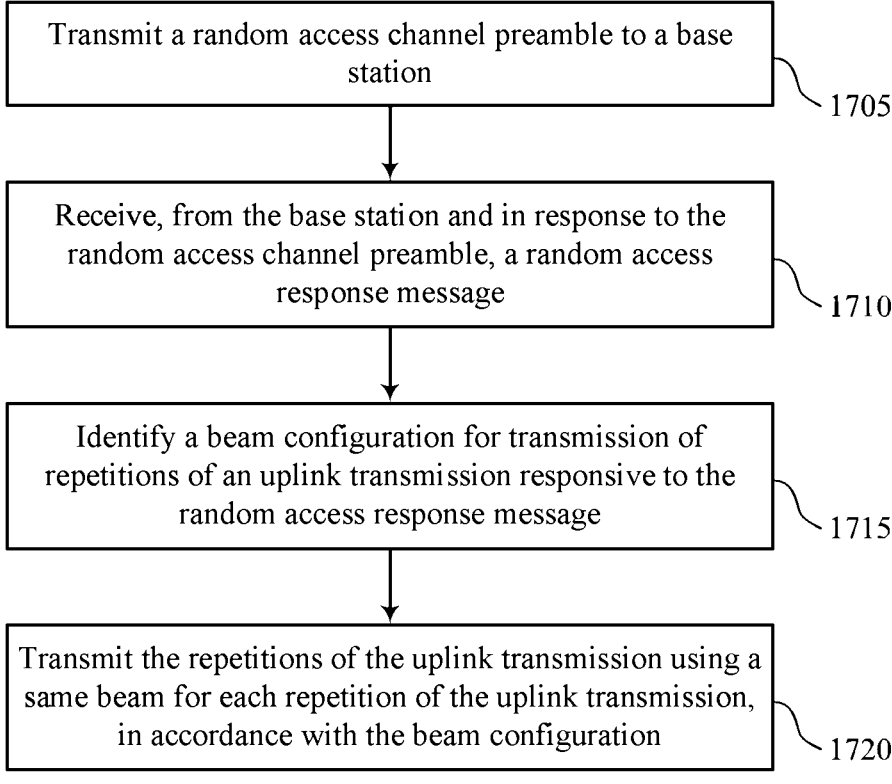

Transmit a random access channel preamble to a base station
1705

Receive, from the base station and in response to the random access channel preamble, a random access response message
1710

Identify a beam configuration for transmission of repetitions of an uplink transmission responsive to the random access response message
1715

Transmit the repetitions of the uplink transmission using a same beam for each repetition of the uplink transmission, in accordance with the beam configuration
1720

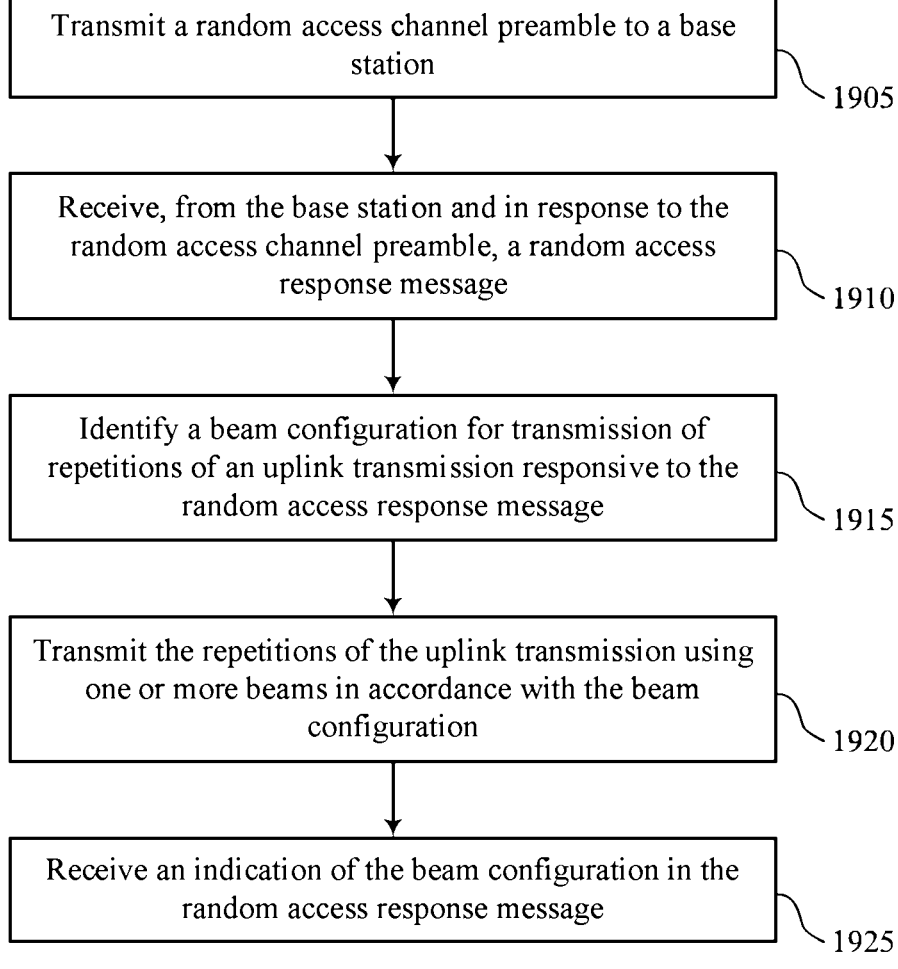

Transmit a random access channel preamble to a base station

1905

Receive, from the base station and in response to the random access channel preamble, a random access response message

1910

Identify a beam configuration for transmission of repetitions of an uplink transmission responsive to the random access response message

1915

Transmit the repetitions of the uplink transmission using one or more beams in accordance with the beam configuration

1920

Receive an indication of the beam configuration in the random access response message

SPATIAL DOMAIN TRANSMISSION RELATION CONSIDERATIONS FOR SHARED CHANNEL REPETITIONS

CROSS REFERENCE

The present Application is a 371 national stage filing of International PCT Application No. PCT/CN2021/072036 by L Y et al. entitled "SPATIAL DOMAIN TRANSMISSION RELATION CONSIDERATIONS FOR SHARED CHANNEL REPETITIONS," filed Jan. 15, 2021, which is assigned to the assignee hereof, and which is expressly incorporated by reference in its entirety herein.

FIELD OF TECHNOLOGY

The following relates to wireless communications, including spatial domain transmission relation considerations for shared channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may initiate communications with a base station according to a random access procedure. The UE may transmit messages of the random access procedure using a set of beams, or spatial domain filters.

SUMMARY

The described techniques relate to improved methods, systems, devices, and apparatuses that support spatial domain transmission relation considerations for shared channel repetitions. Generally, the described techniques provide for a user equipment (UE) communicating using a set of beams with a base station, including communicating according to a random access procedure. A UE may initiate a random access procedure with a base station by transmitting a random access channel (RACH) preamble to the base station. The UE may receive, from the base station and in response to the RACH preamble, a random access response (RAR) message. The UE may then identify a beam configuration for transmission of repetitions of an uplink transmission response to the RAR message. The beam configuration for the repetitions of the uplink transmission response may be a default beam configuration that is based, at least in part, on a beam configuration for an initial repetition. In other instances, the beam configuration for the repetitions may be received in a message from the base station. In some examples, the beam configuration may be received in the RAR message, or may be received in system information (SI) messages or other downlink control information (DCI) messages. The beam configuration may direct that repetitions of the uplink transmission response are to use a same beam or spatial domain transmission relation or filter. Alternatively, the beam configuration may direct that different beams or spatial domain transmission relations or filters are to be used by repetitions of the uplink transmission response. Beams or spatial domain transmission relations or filters of repetitions in different transmissions (for example, of an initial uplink transmission response and of one or more retransmissions of the uplink transmission response) may also be the same across transmissions or may vary, based on the beam configuration. The UE transmits the repetitions of the uplink transmission using one or more beams or spatial domain transmission relations or filters in accordance with the beam configuration.

A method for wireless communications for a user equipment (UE) is described. The method may include transmitting a RACH preamble to a base station, receiving, from the base station and in response to the RACH preamble, a RAR message, identifying a beam configuration for transmission of repetitions of an uplink transmission responsive to the RAR message, and transmitting the repetitions of the uplink transmission using one or more beams in accordance with the beam configuration.

An apparatus for wireless communications for a UE is described. The apparatus may include a processor, memory in electronic communication with the processor, and instructions stored in the memory. The instructions may be executable by the processor to cause the apparatus to transmit a RACH preamble to a base station, receive, from the base station and in response to the RACH preamble, a RAR message, identify a beam configuration for transmission of repetitions of an uplink transmission responsive to the RAR message, and transmit the repetitions of the uplink transmission using one or more beams in accordance with the beam configuration.

Another apparatus for wireless communications for a UE is described. The apparatus may include means for transmitting a RACH preamble to a base station, means for receiving, from the base station and in response to the RACH preamble, a RAR message, means for identifying a beam configuration for transmission of repetitions of an uplink transmission responsive to the RAR message, and means for transmitting the repetitions of the uplink transmission using one or more beams in accordance with the beam configuration.

A non-transitory computer-readable medium storing code for wireless communications for a UE is described. The code may include instructions executable by a processor to transmit a RACH preamble to a base station, receive, from the base station and in response to the RACH preamble, a RAR message, identify a beam configuration for transmission of repetitions of an uplink transmission responsive to the RAR message, and transmit the repetitions of the uplink transmission using one or more beams in accordance with the beam configuration.

In some examples of the method, apparatuses, and non-transitory computer-readable medium described herein, transmitting the repetitions of the uplink transmission may include operations, features, means, or instructions for transmitting the repetitions of the uplink transmission using a same beam for each repetition of the uplink transmission, in accordance with the beam configuration.

In some examples of the method, apparatuses, and non-transitory computer-readable medium described herein, transmitting the repetitions of the uplink transmission may include operations, features, means, or instructions for transmitting the repetitions of the uplink transmission using a different beam for each repetition of the uplink transmission, in accordance with the beam configuration.

In some examples of the method, apparatuses, and non-transitory computer-readable medium described herein, the uplink transmission includes an initial transmission of the uplink transmission responsive to the RAR message of a four-step random access procedure.

In some examples of the method, apparatuses, and non-transitory computer-readable medium described herein, the uplink transmission includes a retransmission of the uplink transmission responsive to the RAR message of a four-step random access procedure.

Some examples of the method, apparatuses, and non-transitory computer-readable medium described herein may further include operations, features, means, or instructions for transmitting repetitions of one or more retransmissions of the uplink transmission, where the repetitions of the uplink transmission and the repetitions of the one or more retransmissions of the uplink transmission may be transmitted using same beams for respective repetitions within the uplink transmission and the one or more retransmissions of the uplink transmission, in accordance with the beam configuration.

Some examples of the method, apparatuses, and non-transitory computer-readable medium described herein may further include operations, features, means, or instructions for transmitting repetitions of one or more retransmissions of the uplink transmission, where the repetitions of the uplink transmission and the repetitions of the one or more retransmissions of the uplink transmission may be transmitted using different beams for respective repetitions within the uplink transmission and the one or more retransmissions of the uplink transmission, in accordance with the beam configuration.

In some examples of the method, apparatuses, and non-transitory computer-readable medium described herein, identifying the beam configuration may include operations, features, means, or instructions for receiving an indication of the beam configuration in the RAR message.

In some examples of the method, apparatuses, and non-transitory computer-readable medium described herein, identifying the beam configuration may include operations, features, means, or instructions for receiving an indication of the beam configuration in a system information message.

In some examples of the method, apparatuses, and non-transitory computer-readable medium described herein, identifying the beam configuration may include operations, features, means, or instructions for receiving an indication of the beam configuration in a DCI message that includes a cyclic redundancy check (CRC) scrambled by either a random access radio network temporary identifier (RA-RNTI) or a temporary cell random access radio network temporary identifier (TC-RNTI).

In some examples of the method, apparatuses, and non-transitory computer-readable medium described herein, the one or more beams each correspond to a different spatial domain filter.

In some examples of the method, apparatuses, and non-transitory computer-readable medium described herein, the repetitions of the uplink transmission may be repeated using a same symbol allocation in consecutive slots.

A method for wireless communications at a base station is described. The method may include receiving a RACH preamble from a UE, transmitting, to the UE and in response to the RACH preamble, a RAR message, transmitting an indication of a beam configuration for UE transmission of repetitions of an uplink transmission responsive to the RAR message, and receiving the repetitions of the uplink transmission from the UE in accordance with the beam configuration.

An apparatus for wireless communications at a base station is described. The apparatus may include a processor, memory in electronic communication with the processor, and instructions stored in the memory. The instructions may be executable by the processor to cause the apparatus to receive a RACH preamble from a UE, transmit, to the UE and in response to the RACH preamble, a RAR message, transmit an indication of a beam configuration for UE transmission of repetitions of an uplink transmission responsive to the RAR message, and receive the repetitions of the uplink transmission from the UE in accordance with the beam configuration.

Another apparatus for wireless communications at a base station is described. The apparatus may include means for receiving a RACH preamble from a UE, means for transmitting, to the UE and in response to the RACH preamble, a RAR message, means for transmitting an indication of a beam configuration for UE transmission of repetitions of an uplink transmission responsive to the RAR message, and means for receiving the repetitions of the uplink transmission from the UE in accordance with the beam configuration.

A non-transitory computer-readable medium storing code for wireless communications at a base station is described. The code may include instructions executable by a processor to receive a RACH preamble from a UE, transmit, to the UE and in response to the RACH preamble, a RAR message, transmit an indication of a beam configuration for UE transmission of repetitions of an uplink transmission responsive to the RAR message, and receive the repetitions of the uplink transmission from the UE in accordance with the beam configuration.

In some examples of the method, apparatuses, and non-transitory computer-readable medium described herein, the beam configuration indicates that the repetitions may be to be transmitted by the UE using a same beam for each repetition of the uplink transmission.

In some examples of the method, apparatuses, and non-transitory computer-readable medium described herein, the beam configuration indicates that the repetitions may be to be transmitted by the UE using a different beam for each repetition of the uplink transmission.

In some examples of the method, apparatuses, and non-transitory computer-readable medium described herein, the uplink transmission includes an initial transmission of the uplink transmission responsive to the RAR message of a four-step random access procedure.

In some examples of the method, apparatuses, and non-transitory computer-readable medium described herein, the uplink transmission includes a retransmission of the uplink transmission responsive to the RAR message of a four-step random access procedure.

In some examples of the method, apparatuses, and non-transitory computer-readable medium described herein, the beam configuration indicates that the repetitions of the uplink transmission and the repetitions of the one or more retransmissions of the uplink transmission may be to be transmitted by the UE using a same beam for respective repetitions within the uplink transmission and the one or more retransmissions of the uplink transmission.

In some examples of the method, apparatuses, and non-transitory computer-readable medium described herein, the beam configuration indicates that the repetitions of the uplink transmission and the repetitions of the one or more retransmissions of the uplink transmission may be to be transmitted by the UE using a different beam for respective repetitions within the uplink transmission and the one or more retransmissions of the uplink transmission.

In some examples of the method, apparatuses, and non-transitory computer-readable medium described herein, transmitting the indication of the beam configuration may include operations, features, means, or instructions for transmitting the indication of the beam configuration in the RAR message.

In some examples of the method, apparatuses, and non-transitory computer-readable medium described herein, transmitting the indication of the beam configuration may include operations, features, means, or instructions for transmitting the indication of the beam configuration in a system information message.

In some examples of the method, apparatuses, and non-transitory computer-readable medium described herein, transmitting the indication of the beam configuration may include operations, features, means, or instructions for transmitting the indication of the beam configuration in a DCI message that includes a CRC scrambled by either a RA-RNTI or a TC-RNTI.

In some examples of the method, apparatuses, and non-transitory computer-readable medium described herein, the repetitions of the uplink transmission may be repeated using a same symbol allocation in consecutive slots.

BRIEF DESCRIPTION OF THE DRAWINGS

FIG. 5 illustrates an example of a beam transmission configuration that supports spatial domain transmission relation considerations for shared channel repetitions in accordance with aspects of the present disclosure.

FIG. 6 illustrates an example of a beam transmission configuration that supports spatial domain transmission relation considerations for shared channel repetitions in accordance with aspects of the present disclosure.

FIGS. 16 through 19 show flowcharts illustrating methods that support spatial domain transmission relation considerations for shared channel repetitions in accordance with aspects of the present disclosure.

DETAILED DESCRIPTION

Figure 1:
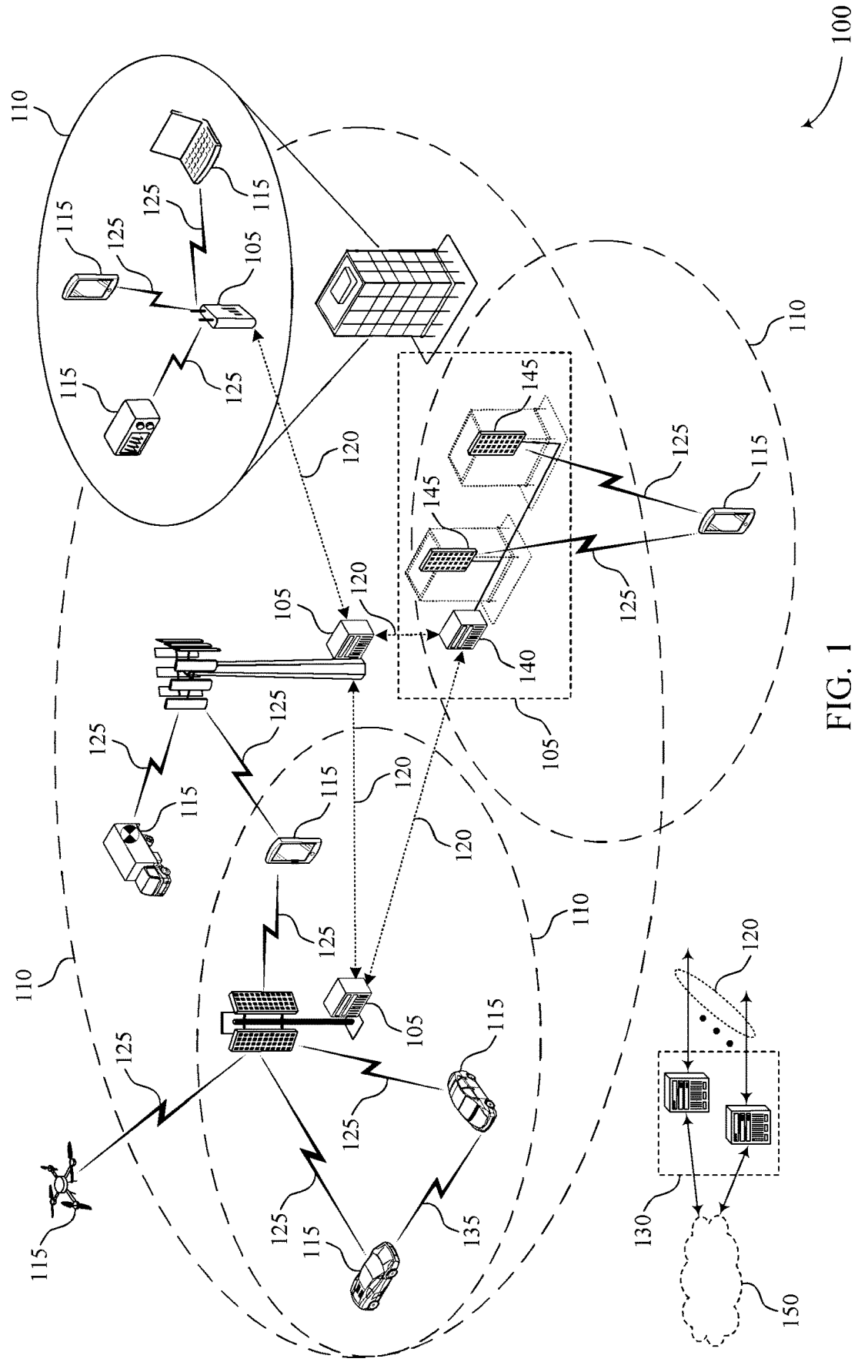
FIG. 1 illustrates an example of a wireless communications system that supports spatial domain transmission relation considerations for shared channel repetitions in accordance with aspects of the present disclosure.

Some wireless communications systems may use random access channel (RACH) procedures for channel access. For example, a four-step RACH procedure may include a user equipment (UE) attempting to establish a connection with a base station by transmitting a RACH preamble (e.g., a RACH message one (Msg1)) to the base station that indicates the request. The base station may respond with a random access response (RAR) message (e.g., a RACH message two (Msg2)). The RAR message may provide timing advance information, identification information, and an uplink grant for a next RACH message from the UE (e.g., a RACH message three (Msg3) responsive to Msg2). The RACH procedure may continue with the UE transmitting an initial RACH Msg3 indicating a connection request or a scheduling request, or both. The base station may respond with a fourth RACH message (e.g., RACH message 4 (Msg4)) transmission for contention resolution.

A UE may transmit repetitions of the third RACH message. The UE may transmit K number of repetitions according to a repetition configuration. The repetition configuration may be indicated by the RAR message or by a downlink control information (DCI) message from the base station. For example, repetitions of the initial third RACH message may be configured in a RAR message, and repetitions of retransmissions of the third RACH message may be configured in a DCI message.

The UE may communicate with the base station using beams that may correspond to spatial domain transmission filters. A spatial domain transmission relation may be an example of a spatial domain transmission filter, where a spatial domain filter for a transmission is based on or related to the spatial domain filter for another transmission. In some examples, a spatial domain transmission filter may be indicated as a beam. The UE may transmit and receive transmissions with a set of beams. A UE may determine which beams to use to transmit the repetitions of the initial third RACH message or repetitions of the retransmissions of the third RACH message.

The UE may transmit repetitions of the initial third RACH message using the same beam or different beams. The UE may transmit repetitions of retransmissions of the third RACH message using the same or different beams. Beams may also vary or remain the same for repetitions of different transmissions. For example, the beams used by repetitions of an initial Msg3 or a retransmission of Msg3 may vary from the beams used by repetitions of a different retransmission of Msg3. Alternatively, the spatial domain transmission filters for repetitions between transmissions may remain the same. Whether to use the same or different beams for each transmission may be determined at the UE according to a beam configuration. The beam configuration may be preconfigured at the UE. Additionally or alternatively, the base station may transmit the beam configuration to the UE in the RAR message, in a DCI message, or in a prior system information (SI) message. The UE may transmit the repetitions according to the determined beam configuration.

Aspects of the disclosure are initially described in the context of wireless communications systems. Aspects of the disclosure are then described in the context of beam transmission configurations and process flows. Aspects of the disclosure are further illustrated by and described with reference to apparatus diagrams, system diagrams, and flowcharts that relate to spatial domain transmission relation considerations for shared channel repetitions.

FIG. 1 illustrates an example of a wireless communications system 100 that supports spatial domain transmission relation considerations for shared channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (0 f) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may initiate a random access procedure with a base station. The UE 115 may transmit a RACH preamble to the base station 105. The UE 115 may receive, from the base station and in response to the RACH preamble, a RAR message. The UE 115 may then identify a beam configuration for transmission of repetitions of an uplink transmission response to the RAR message. The UE 115 may then transmit the repetitions of the uplink transmission using one or more beams, also referenced herein as spatial domain transmission filters or relations, in accordance with the beam configuration.

Figure 2:
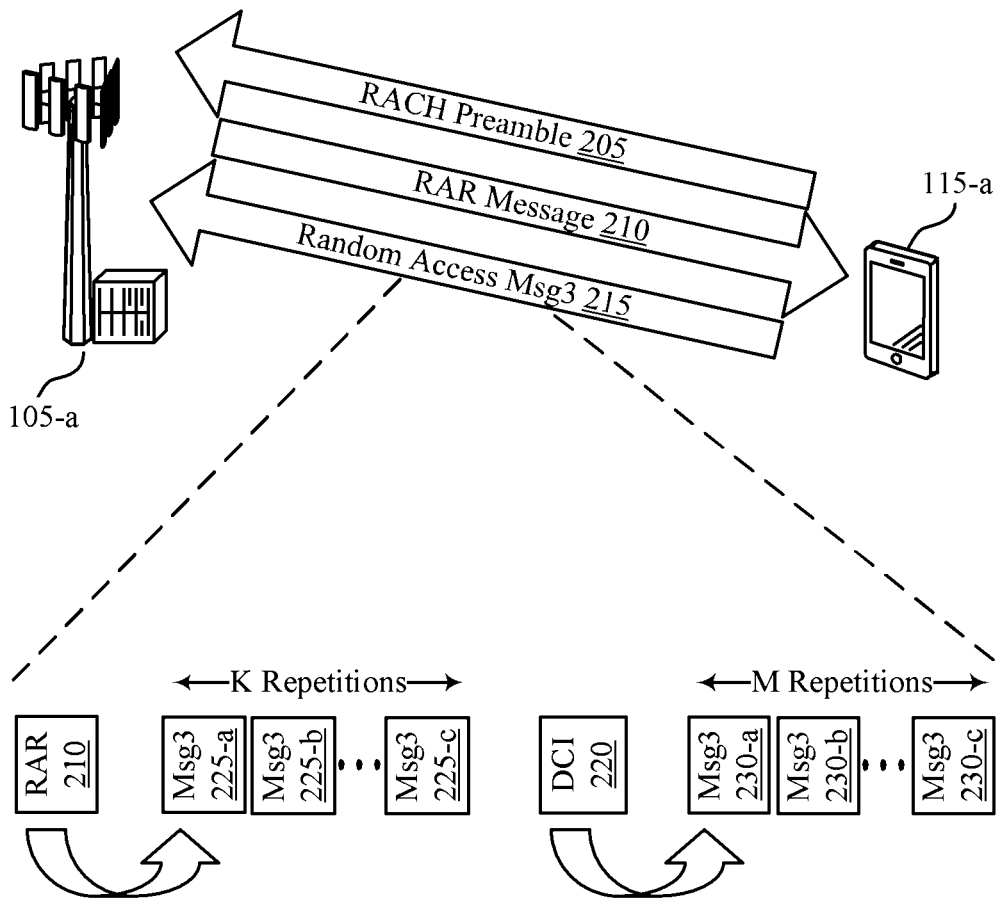
FIG. 2 illustrates an example of a wireless communications system that supports spatial domain transmission relation considerations for shared channel repetitions in accordance with aspects of the present disclosure.

FIG. 2 illustrates an example of a wireless communications system 200 that supports spatial domain transmission relation considerations for shared channel repetitions in accordance with aspects of the present disclosure. Wireless communication system 200 may implement aspects of wireless communication system 100. Wireless communication system 200 may include base station 105-*a* which may be an example of a base station 105 as described with respect to FIG. 1. Wireless communications system 200 may include UE 115-*a*, which may be an example of a UE 115 as described with respect to FIG. 1. UE 115-*a* and base station 105-*a* may transmit and receive downlink and uplink messages.

Wireless communications system 200 may support a four-step RACH procedure between base station 105-*a* and UE 115-*a*. The RACH procedure may allow UE 115-*a* to connect to the network via base station 105-*a* using the wireless connection established using the RACH procedure. The RACH procedure may provide for uplink and downlink synchronization between base station 105-*a* and UE 115-*a*, as well as scheduling information. The four-step RACH procedure may utilize at least four messages exchanges between base station 105-*a* and UE 115-*a* to establish the connect.

The first step of the four-step RACH procedure may involve UE 115-*a* transmitting RACH preamble 205 (e.g., RACH Msg1) to base station 105-*a*. The RACH preamble 205 may signal to base station 105-*a*, that UE 115-*a* may be located proximate to base station 105-*a*, and that UE 115-*a* is attempting to establish a wireless connection with base station 105-*a* via the RACH procedure. The RACH preamble may be transmitted on a physical random access channel (PRACH).

The second step of the four-step RACH procedure may involve base station 105-*a* transmitting RAR message 210 (e.g., RACH Msg2) to UE 115-*a*. Base station 105-*a* may transmit the RAR message 210 in a downlink channel, (e.g., physical downlink control channel (PDCCH) or physical downlink shared channel (PDSCH)). RAR message 210 may identify timing advance information (e.g., synchronization information), an uplink grant including resources for a RACH third message (e.g., RACH Msg3) transmission from UE 115-*a*, identification information (e.g., a temporary cell random network temporary identifier (TC-RNTI)), and other information. For example, upon receiving RACH preamble 205, base station 105-*a* may identify a TC-RNTI, as well as uplink and downlink scheduling resources for UE 115-*a*, and include that information in RAR message 210.

Upon receiving RAR message 210, UE 115-*a* may transmit a RACH third message 215 (e.g., RACH Msg3) to base station 105-*a*. RACH third message 215 may convey a RRC connection request, a scheduling request (SR), a buffer status report (BSR), or other information. For example, UE 115-*a* may determine that it received RAR message 210, that includes a same identifier as the identifier transmitted in RACH preamble 205. Based on the match identifiers, UE 115-*a* may transmit uplink scheduling information in RACH third message 215. RACH third message 215 may occur via physical uplink shared channel (PUSCH). The RACH third message 215 may be referred to as an uplink transmission herein.

Base station 105-*a* may respond to RACH third message 215 with a fourth RACH message for contention resolution. The fourth RACH message may be transmitted in a PDCCH or PDSCH. If base station 105-*a* and UE 115-*a* complete contention resolution before the timer expires, UE 115-*a* may establish a wireless connection with base station 105-*a*. If the timer expires before contention resolution is completed, the RACH procedure may be retried or UE 115-*a* may attempt another RACH procedure with a different base station 105.

Wireless communication system 200 may support PUSCH repetitions for RACH third message 215 transmissions (which may also be referred to as uplink transmission(s) herein). This may include, for RACH third message 215 transmission, an initial transmission being scheduled by the uplink grant scheduling resources may be indicated by base station 105-*a* RAR message 210 (e.g., the scheduling resource indicated in RACH Msg2). Retransmissions of RACH third message 215 may be scheduled by a DCI transmission. For example, retransmissions of RACH third message 215 may be scheduled by a DCI message of format 0_0 with CRC scrambled by a TC-RNTI in the corresponding RAR. On the other hand, for other PUSCH transmissions (e.g., PUSCH scheduled by DCI format 0_1 in PDCCH with CRC scrambled with C-RNTI, MCS-C-RNTI, or CS-RNTI with new data indicator (NDI) equal to 1), PUSCH transmission may be repeated to provide coverage extension and reliability (e.g., PUSCH repetition Type A). For example, when UE 115-*a* transmits PUSCH scheduled by DCI format 0_1 in PDCCH with CRC scrambled with C-RNTI, MCS-C-RNTI, or with CS-RNTI with NDI=1, if UE 115-*a* is configured with a PUSCH aggregation factor (e.g., pusch-AggregationFactor) consecutive slots and the PUSCH is limited to a single transmission layer, UE 115-*a* may repeat the transport block (TB) across consecutive slots (e.g., according to a PUSCH aggregation factor) applying the same symbol allocation in each slot. PUSCH Type B may use different symbol allocations in slots applied across the PUSCH transmissions. UE 115-*a* may thus transmit repetitions of initial transmissions of RACH third message 215. UE 115-*a* may also transmit repetitions of retransmissions or RACH third message 215.

UE 115-*a* may transmit initial transmissions of RACH third message 215 with an initial beam. The initial transmission of RACH third message 215 may be Msg3 225-*a*, which may be transmitted in response to RAR message 210. UE 115-*a* may determine a beam configuration. The beam configuration may indicate whether the subsequent K repetitions (e.g., according to Type-A configuration) of Msg3 225-*a* may be transmitted with a same or different beam. The subsequent K repetitions may include Msg3 225-*b* and Msg3 225-*c*.

Similarly, UE 115-*a* may also transmit an initial retransmission of RACH third message 215 with an initial beam, and may also transmit repetitions of the retransmission of RACH third message 215. UE 115-*a* may receive DCI 220, and may transmit initial retransmission of RACH third message 215 as Msg3 230-*a* in response to DCI 220. UE 115-*a* may determine, based on the beam configuration, whether to transmit repetitions 230-*b* and 230-*c* of Msg3 with a same or different beam as Msg3 230-*a*. DCI 220 may schedule M repetitions of Msg3 230, including Msg3 230-*a*, 230-*b*, and 230-*c*.

UE 115-*a* may be preconfigured with the beam configuration, or UE 115-*a* may receive the beam configuration from the base station 105-*a*. Base station 105-*a* may transmit in indication of the beam configuration in a SI prior to the RACH procedure, in RAR message 210, or in DCI 220.

Figure 3:
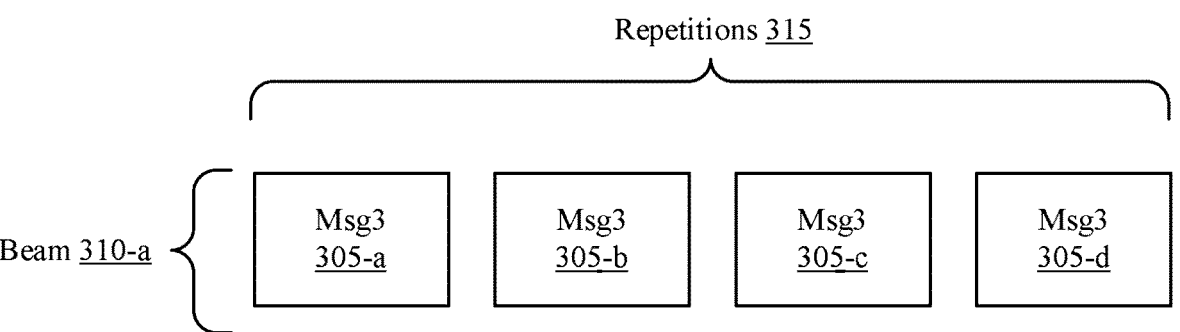
FIG. 3 illustrates an example of a beam transmission configuration that supports spatial domain transmission relation considerations for shared channel repetitions in accordance with aspects of the present disclosure.

FIG. 3 illustrates an example of a beam transmission configuration 300 that supports spatial domain transmission relation considerations for shared channel repetitions in accordance with aspects of the present disclosure. A UE 115, as described with respect to wireless communications systems 100 and 200, may transmit repetitions 315 according to the beam transmission configuration 300.

A UE 115 may transmit repetitions 315. Repetitions 315 may be repeated transmissions of a RACH third message. RACH third message may be defined as Msg3 305. The UE 115 may transmit Msg3 305-a in response to receiving a RAR message from a base station, as part of a four-step random access procedure. Msg3 305-a may be an initial transmission of a RACH third message. The UE 115 may transmit initial Msg3 305-a using a first beam 310-a.

The UE 115 may determine a beam configuration, indicating whether to use a same beam or a different beam for transmissions of repetitions of Msg3 305. The UE 115 may determine the beam configuration based on a preconfiguration at the UE 115, or based on signaling from a base station 105. The signaling from the base station 105 may be received by the UE 115 in a SI message, a RAR message, or a DCI message. In some cases, the UE 115 may be configured with the ability to use a same beam or a different beam, and the signaling from the base station may indicate which option to use. In other cases, the UE 115 may only be configured to either use a same beam, or to use a different beam, and the UE 115 may transmit based on the configuration.

The beam configuration may indicate that the UE 115 is to transmit repetitions of the Msg3 305 using a same beam as the initial Msg3 305-a. Thus, the UE 115 may transmit repetitions Msg3 305-b, Msg3 305-c, and Msg3 305-d using same beam 505-a as the first transmission Msg3 305-a.

Figure 4:
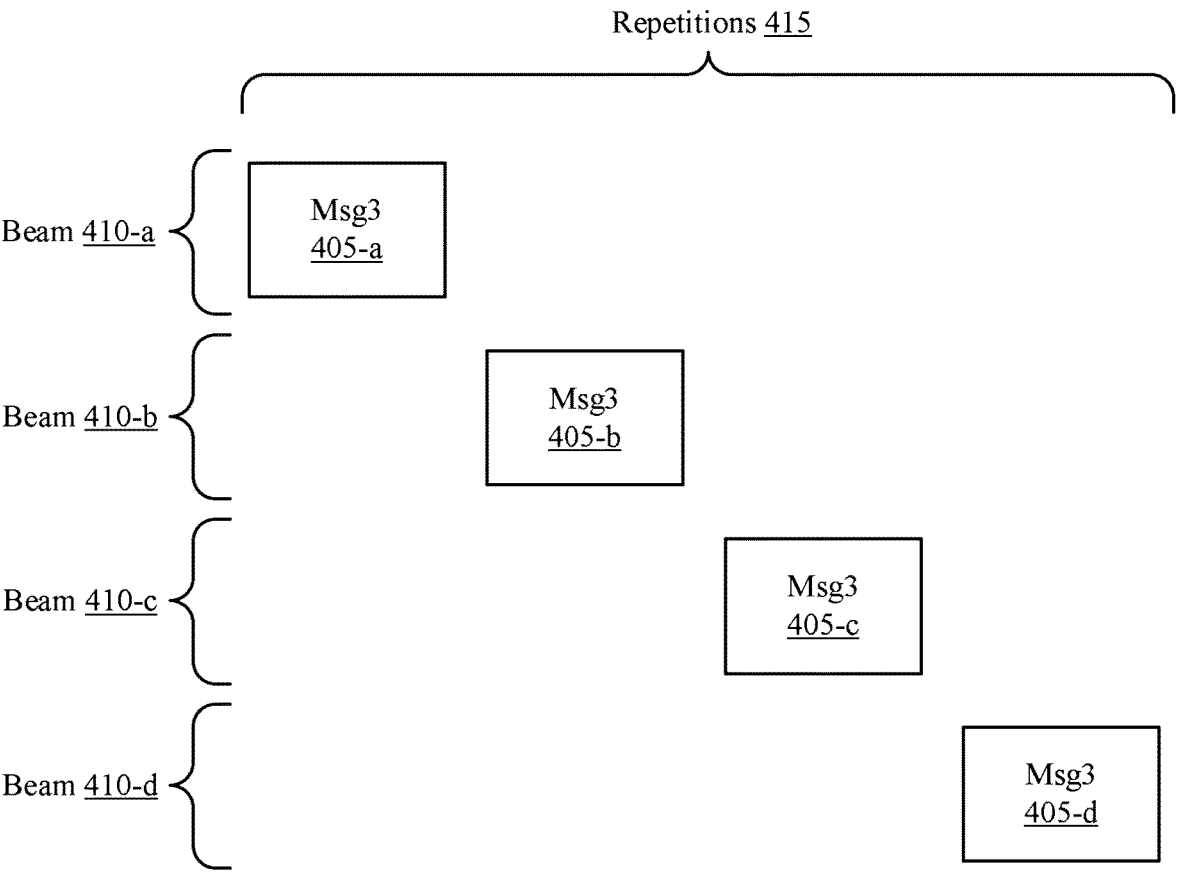
FIG. 4 illustrates an example of a beam transmission configuration that supports spatial domain transmission relation considerations for shared channel repetitions in accordance with aspects of the present disclosure.

FIG. 4 illustrates an example of a beam transmission configuration 400 that supports spatial domain transmission relation considerations for shared channel repetitions in accordance with aspects of the present disclosure. A UE 115, as described with respect to wireless communications systems 100 and 200, may transmit repetitions 415 according to the beam transmission configuration 400.

A UE 115 may transmit repetitions 415. Repetitions 415 may be repeated transmissions of a RACH third message. RACH third message may be defined as Msg3 405. The UE 115 may transmit Msg3 405-a in response to receiving a RAR message from a base station 105, as part of a four-step random access procedure. Msg3 405-a may be an initial transmission of a RACH third message. The UE 115 may transmit initial Msg3 405-a using a first beam 410-a.

The UE 115 may determine a beam configuration, indicating whether to use a same beam or a different beam for transmissions of repetitions of Msg3 405. The UE 115 may determine the beam configuration based on a preconfiguration at the UE 115, or based on signaling from a base station 105. The signaling from the base station 105 may be received by the UE 115 in a SI message, a RAR message, or a DCI message. In some cases, the UE 115 may be configured with the ability to use a same beam or a different beam, and the signaling from the base station may indicate which option to use. In other cases, the UE 115 may only be configured to either use a same beam, or to use a different beam, and the UE 115 may transmit based on the configuration.

The beam configuration may indicate that the UE 115 is to transmit repetitions of the Msg3 405 using a different beam as the initial Msg3 405-a. Thus, the UE 115 may transmit repetitions Msg3 405-b using a different beam 410-b, Msg3 405-c using a different beam 410-c, and Msg3 405-d using a different beam 410-d. Each of beam 410 may correspond to different spatial domain transmission filters.

FIG. 5 illustrates an example of a beam transmission configuration 500 that supports spatial domain transmission relation considerations for shared channel repetitions in accordance with aspects of the present disclosure. A UE 115, as described with respect to wireless communications systems 100 and 200, may transmit transmission 520 according to the beam transmission configuration 500.

A UE 115 may transmit transmission 520. Transmission 520 may include a first initial transmission of Msg3 505-a. Msg3 505-b, Msg3 505-c, and Msg3 505-d may be repetitions of initial Msg3 505-a. The UE 115 may transmit Msg3 305-a in response to receiving a RAR message from a base station 105, as part of a four-step random access procedure. The UE 115 may transmit initial Msg3 505-a using a first beam 510-a.

The UE 115 may determine a beam configuration, indicating whether to use a same beam or a different beam for transmissions of repetitions of Msg3 505. The UE 115 may determine the beam configuration based on a preconfiguration at the UE 115, or based on signaling from a base station 105. The signaling from the base station 105 may be received by the UE 115 in a SI message, a RAR message, or a DCI message. In some cases, the UE 115 may be configured with the ability to use a same beam or a different beam, and the signaling from the base station may indicate which option to use. In other cases, the UE 115 may only be configured to either use a same beam, or to use a different beam, and the UE 115 may transmit based on the configuration.

The beam configuration may indicate that the UE 115 is to transmit repetitions of the Msg3 505 using a same beam as the initial Msg3 505-a. Thus, the UE 115 may transmit repetitions Msg3 505-b, Msg3 505-c, and Msg3 505-d using same beam 510-a as the first transmission Msg3 505-a.

The UE 115 may also transmit transmission 525, which may be a retransmission of transmission 520. The beam configuration may indicate that the UE 115 is to use a same beam for transmission of repetitions of transmission 525, which may be a retransmission. Thus, the UE 115 may transmit retransmission Msg3 515-a, and repetitions Msg3 515-b, Msg3 515-c, and Msg3 515-d of the retransmission using same beam 510-a as used in initial transmission 520.

FIG. 6 illustrates an example of a beam transmission configuration 600 that supports spatial domain transmission relation considerations for shared channel repetitions in accordance with aspects of the present disclosure. A UE 115, as described with respect to wireless communications systems 100 and 200, may transmit transmission 620 according to the beam transmission configuration 600.

A UE 115 may transmit transmission 620. Transmission 620 may include a first initial transmission of Msg3 605-a. Msg3 605-b, Msg3 605-c, and Msg3 605-d may be repetitions of initial Msg3 605-a. The UE 115 may transmit Msg3 305-a in response to receiving a RAR message from a base station 105, as part of a four-step random access procedure. The UE 115 may transmit initial Msg3 605-a using a first beam 610-a.

The UE 115 may determine a beam configuration, indicating whether to use a same beam or a different beam for transmissions of repetitions of Msg3 605. The UE 115 may determine the beam configuration based on a preconfiguration at the UE 115, or based on signaling from a base station 105. The signaling from the base station 105 may be received by the UE 115 in a SI message, a RAR message, or a DCI message. In some cases, the UE 115 may be configured with the ability to use a same beam or a different beam, and the signaling from the base station may indicate which option to use. In other cases, the UE 115 may only be configured to either use a same beam, or to use a different beam, and the UE 115 may transmit based on the configuration.

The beam configuration may indicate that the UE 115 is to transmit repetitions of the Msg3 605 using a different beam as the initial Msg3 605-*a*. Thus, the UE 115 may transmit repetitions Msg3 605-*b* using beam 610-*b*, Msg3 605-*c* using beam 610-*c*, and Msg3 605-*d* using beam 610-*d*. Each of beams 610-*a*, 610-*b*, 610-*c* and 610-*d* may correspond to different spatial domain transmission filters.

The UE 115 may also transmit transmission 625, which may be a retransmission of transmission 620. The beam configuration may indicate that the UE 115 is to use a different beam for transmission of repetitions of transmission 625, which may be a retransmission. Thus, the UE 115 may transmit retransmission Msg3 615-*a* using beam 610-*e*, and repetitions Msg3 615-*b* using beam 610-*f*, Msg3 615-*c* using beam 610-*g*, and Msg3 615-*d* using beam 610-*h*. Each of beams 610-*a*, 610-*b*, 610-*c*, 610-*d*, 610-*e*, 610-*f*, 610-*g*, and 610-*h* may correspond to different spatial domain transmission filters.

Figure 7:
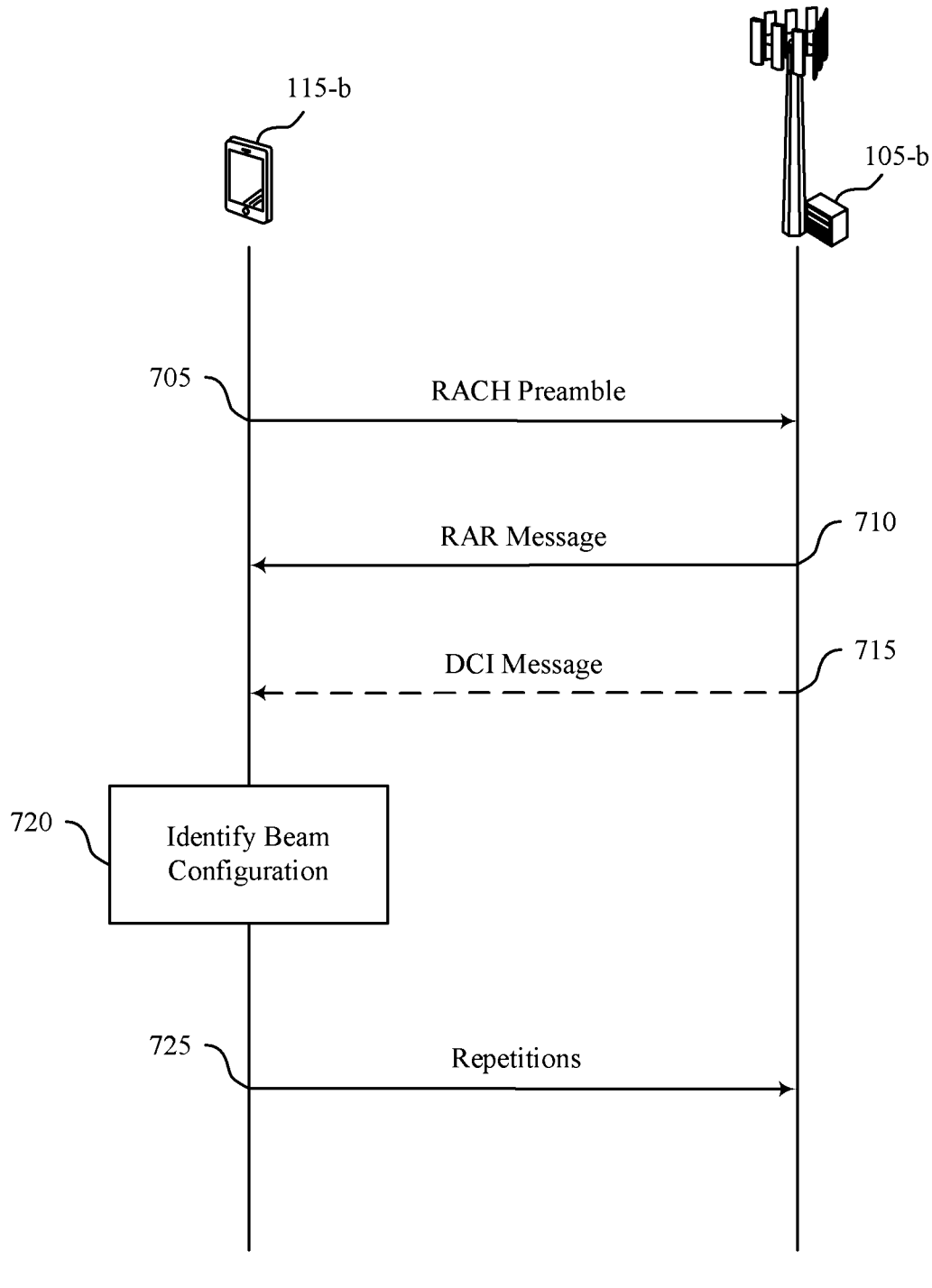
FIG. 7 illustrates an example of a process flow that supports spatial domain transmission relation considerations for shared channel repetitions in accordance with aspects of the present disclosure.

FIG. 7 illustrates an example of a process flow 700 that supports spatial domain transmission relation considerations for shared channel repetitions in accordance with aspects of the present disclosure. Process flow 700 includes base station 105-*b* and UE 115-*b*, which may be examples of base stations 105 and UEs 115 respectively, as described herein. Base station 105-*b* and UE 115-*b* may communicate according to a random access procedure. UE 115-*b* may communicate using a set of transmit and receive beams.

At 705, UE 115-*b* may transmit a RACH preamble to base station 105-*b*.

At 710, UE 115-*b* may receive a RAR message. The RAR message may be transmitted by base station 105-*b* in response to the RACH preamble. In some cases, UE 115-*b* may receive an indication of the beam configuration in the RAR message. In some cases, at 715 base station 105-*b* may transmit an indication of the beam configuration in a DCI message that includes a CRC scrambled by either a RA-RNTI or a TC-RNTI. In other cases, base station 105-*b* may transmit an indication of the beam configuration in a SI message. The SI message may be transmitted before the start of the RACH procedure (e.g., before the transmission of the RACH preamble at 705).

At 720, UE 115-*b* may identify a beam configuration for transmission of repetitions of an uplink transmission responsive to the RAR message.

At 725, UE 115-*b* may transmit the repetitions of the uplink transmission using a same beam for each repetition of the uplink transmission, which may be in accordance with the beam configuration. In some cases, the uplink transmission may be an initial transmission of the uplink transmission responsive to the RAR message received at 710. In these cases, the uplink transmission responsive to the RAR message may be a RACH third message (e.g., RACH Msg3). In some cases, the uplink transmission may also be a retransmission of the uplink transmission responsive to the RAR message of a four-step RACH procedure. In these cases, the uplink transmission may be a retransmission of a RACH third message (e.g., RACH Msg3). In some cases, the repetitions of the uplink transmission may be repeated using a same symbol allocation in consecutive slots (e.g., in a Type-A transmission configuration).

In some cases, UE 115-*b* may transmit the repetitions of the uplink transmission using a same beam for each repetition of the uplink transmission, in accordance with the beam configuration. In some cases, UE 115-*b* may transmit the repetitions of the uplink transmission using a different beam for each repetition of the uplink transmission, in accordance with the beam configuration.

In some cases, UE 115-*b* may transmit repetitions of one or more retransmissions of the uplink transmission. The repetitions of the uplink transmission and the repetitions of the one or more retransmissions of the uplink transmission may be transmitted using same respective beams for each repetition within the uplink transmission and the one or more retransmissions of the uplink transmission, in accordance with the beam configuration. For example, the repetitions of the uplink transmission and the repetitions of the one or more retransmissions of the uplink transmission may be transmitted using same beams for respective repetitions within the uplink transmission and the one or more retransmissions of the uplink transmission, in accordance with the beam configuration.

In some cases, UE 115-*b* may transmit repetitions of one or more retransmissions of the uplink transmission using a different beam for each repetition, in accordance with the beam configuration. For example, the repetitions of the uplink transmission and the repetitions of the one or more retransmissions of the uplink transmission may be transmitted using different beams for respective repetitions within the uplink transmission and the one or more retransmissions of the uplink transmission, in accordance with the beam configuration.

The beams used may each correspond to a different spatial domain filter.

Figure 8:
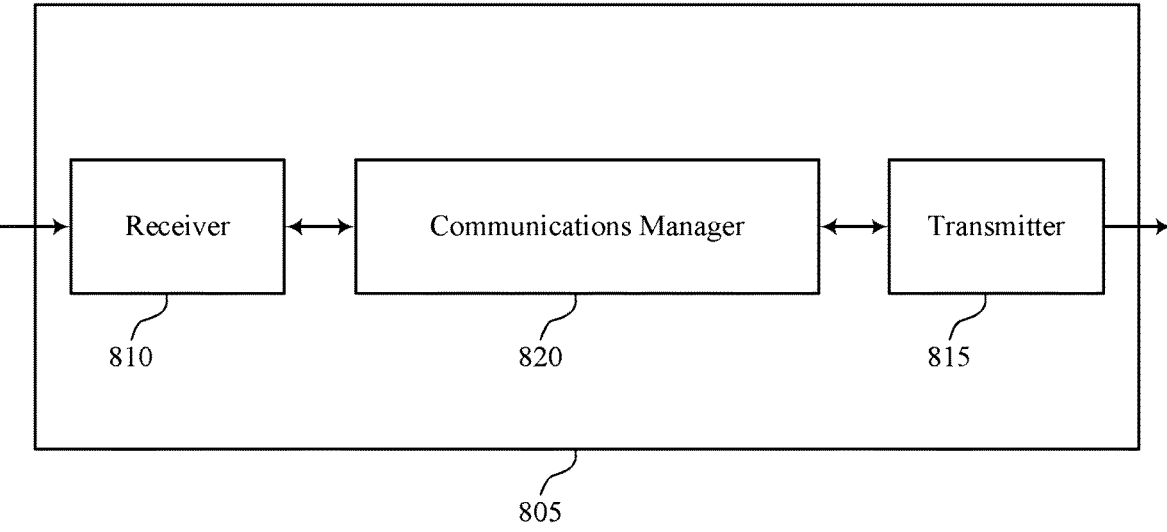
FIGS. 8 and 9 show block diagrams of devices that support spatial domain transmission relation considerations for shared channel repetitions in accordance with aspects of the present disclosure.

FIG. 8 shows a block diagram 800 of a device 805 that supports spatial domain transmission relation considerations for shared channel repetitions in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to spatial domain transmission relation considerations for shared channel repetitions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to spatial domain transmission relation considerations for shared channel repetitions). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of spatial domain transmission relation considerations for shared channel repetitions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications for a UE in accordance with examples as disclosed herein. For example, the communications manager 820 may be configured as or otherwise support a means for transmitting a random access channel preamble to a base station. The communications manager 820 may be configured as or otherwise support a means for receiving, from the base station and in response to the random access channel preamble, a random access response message. The communications manager 820 may be configured as or otherwise support a means for identifying a beam configuration for transmission of repetitions of an uplink transmission responsive to the random access response message. The communications manager 820 may be configured as or otherwise support a means for transmitting the repetitions of the uplink transmission using one or more beams in accordance with the beam configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for efficient utilization of communication resources, as the device 805 may be configured to use a set of beams based on a beam configuration. The varied or similar beam use may decrease interference and latency at the device 805.

Figure 9:
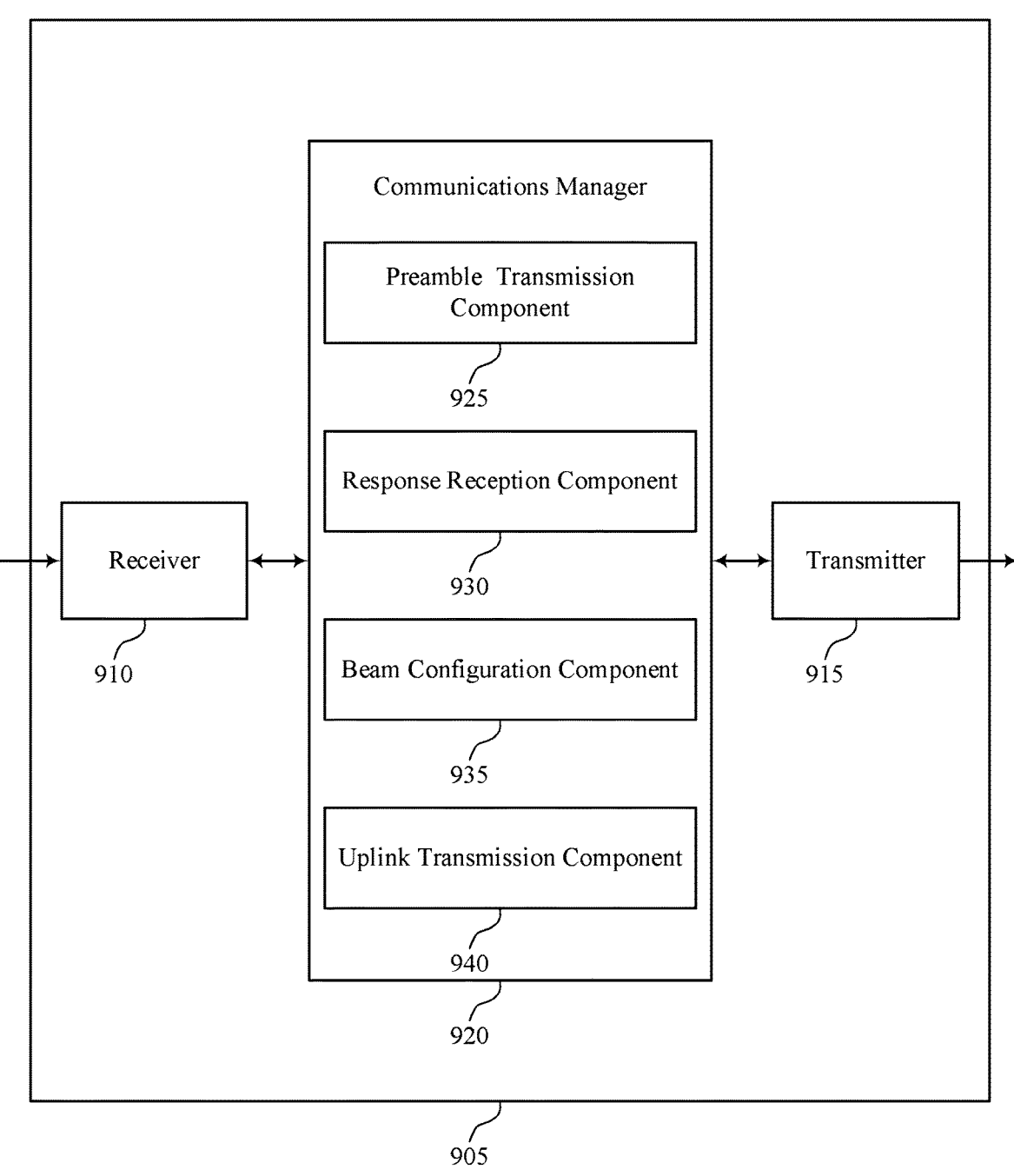

FIG. 9 shows a block diagram 900 of a device 905 that supports spatial domain transmission relation considerations for shared channel repetitions in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to spatial domain transmission relation considerations for shared channel repetitions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to spatial domain transmission relation considerations for shared channel repetitions). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of spatial domain transmission relation considerations for shared channel repetitions as described herein. For example, the communications manager 920 may include a preamble transmission component 925, a response reception component 930, a beam configuration component 935, an uplink transmission component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications for a UE in accordance with examples as disclosed herein. The preamble transmission component 925 may be configured as or otherwise support a means for transmitting a random access channel preamble to a base station. The response reception component 930 may be configured as or otherwise support a means for receiving, from the base station and in response to the random access channel preamble, a random access response message. The beam configuration component 935 may be configured as or otherwise support a means for identifying a beam configuration for transmission of repetitions of an uplink transmission responsive to the random access response message. The uplink transmission component 940 may be configured as or otherwise support a means for transmitting the repetitions of the uplink transmission using one or more beams in accordance with the beam configuration.

Figure 10:
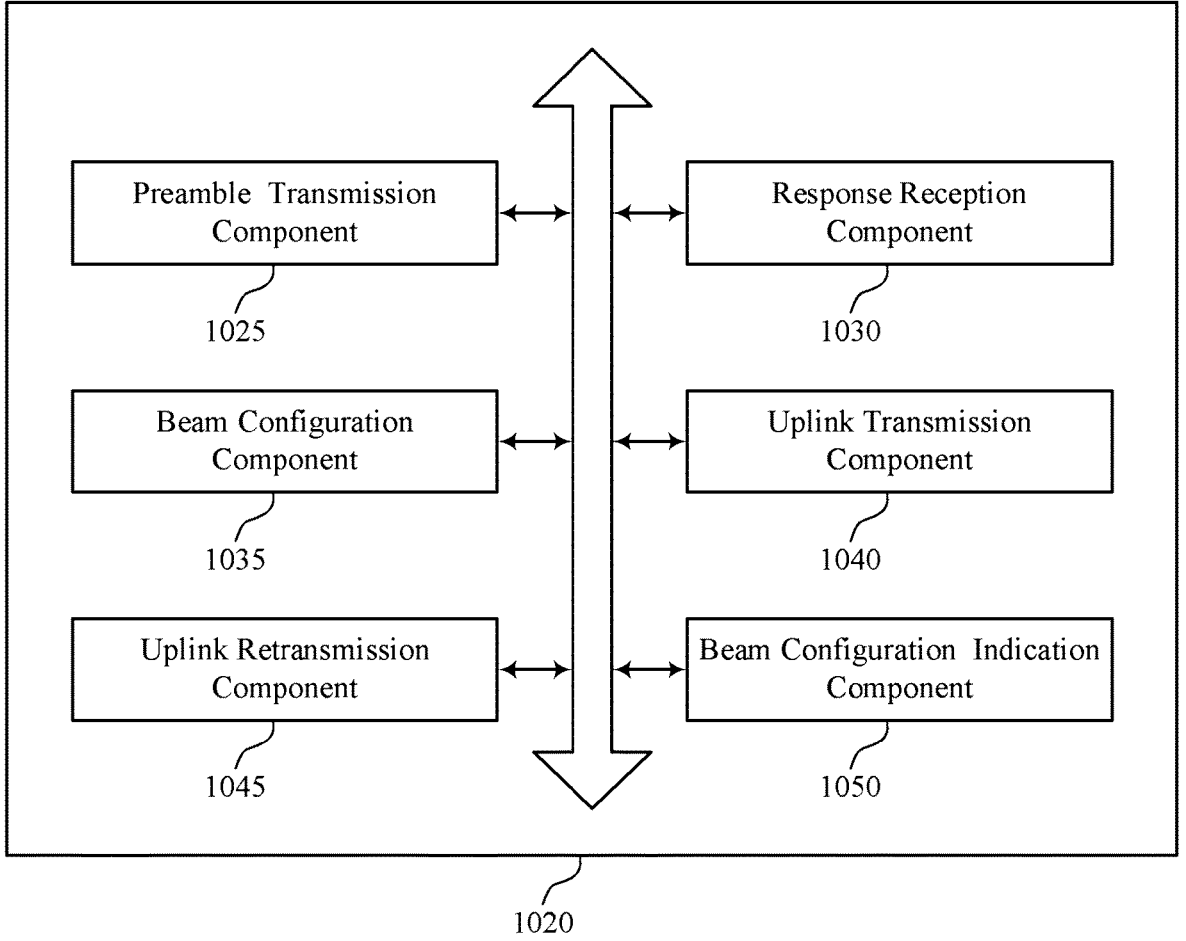
FIG. 10 shows a block diagram of a communications manager that supports spatial domain transmission relation considerations for shared channel repetitions in accordance with aspects of the present disclosure.

FIG. 10 shows a block diagram 1000 of a communications manager 1020 that supports spatial domain transmission relation considerations for shared channel repetitions in accordance with aspects of the present disclosure. The communications manager 1020 may be an example of aspects of a communications manager 820, a communications manager 920, or both, as described herein. The communications manager 1020, or various components thereof, may be an example of means for performing various aspects of spatial domain transmission relation considerations for shared channel repetitions as described herein. For example, the communications manager 1020 may include a preamble transmission component 1025, a response reception component 1030, a beam configuration component 1035, an uplink transmission component 1040, an uplink retransmission component 1045, a beam configuration indication component 1050, or any combination thereof. Each of these components may communicate, directly or indirectly, with one another (e.g., via one or more buses).

The communications manager 1020 may support wireless communications for a UE in accordance with examples as disclosed herein. The preamble transmission component 1025 may be configured as or otherwise support a means for transmitting a random access channel preamble to a base station. The response reception component 1030 may be configured as or otherwise support a means for receiving, from the base station and in response to the random access channel preamble, a random access response message. The beam configuration component 1035 may be configured as or otherwise support a means for identifying a beam configuration for transmission of repetitions of an uplink transmission responsive to the random access response message. The uplink transmission component 1040 may be configured as or otherwise support a means for transmitting the repetitions of the uplink transmission using one or more beams in accordance with the beam configuration.

In some examples, to support transmitting the repetitions of the uplink transmission, the uplink transmission component 1040 may be configured as or otherwise support a means for transmitting the repetitions of the uplink transmission using a same beam for each repetition of the uplink transmission, in accordance with the beam configuration.

In some examples, to support transmitting the repetitions of the uplink transmission, the uplink transmission component 1040 may be configured as or otherwise support a means for transmitting the repetitions of the uplink transmission using a different beam for each repetition of the uplink transmission, in accordance with the beam configuration.

In some examples, the uplink transmission includes an initial transmission of the uplink transmission responsive to the random access response message of a four-step random access procedure.

In some examples, the uplink transmission includes a retransmission of the uplink transmission responsive to the random access response message of a four-step random access procedure.

In some examples, the uplink retransmission component 1045 may be configured as or otherwise support a means for transmitting repetitions of one or more retransmissions of the uplink transmission, wherein the repetitions of the uplink transmission and the repetitions of the one or more retransmissions of the uplink transmission are transmitted using same beams for respective repetitions within the uplink transmission and the one or more retransmissions of the uplink transmission, in accordance with the beam configuration.

In some examples, the uplink retransmission component 1045 may be configured as or otherwise support a means for transmitting repetitions of one or more retransmissions of the uplink transmission, wherein the repetitions of the uplink transmission and the repetitions of the one or more retransmissions of the uplink transmission are transmitted using different beams for respective repetitions within the uplink transmission and the one or more retransmissions of the uplink transmission, in accordance with the beam configuration.

In some examples, to support identifying the beam configuration, the beam configuration indication component 1050 may be configured as or otherwise support a means for receiving an indication of the beam configuration in the random access response message.

In some examples, to support identifying the beam configuration, the beam configuration indication component 1050 may be configured as or otherwise support a means for receiving an indication of the beam configuration in a system information message.

In some examples, to support identifying the beam configuration, the beam configuration indication component 1050 may be configured as or otherwise support a means for receiving an indication of the beam configuration in a downlink control information message that includes a cyclic redundancy check scrambled by either a random access radio network temporary identifier or a temporary cell random access radio network temporary identifier.

In some examples, the one or more beams each correspond to a different spatial domain filter.

In some examples, the repetitions of the uplink transmission are repeated using a same symbol allocation in consecutive slots.

Figure 11:
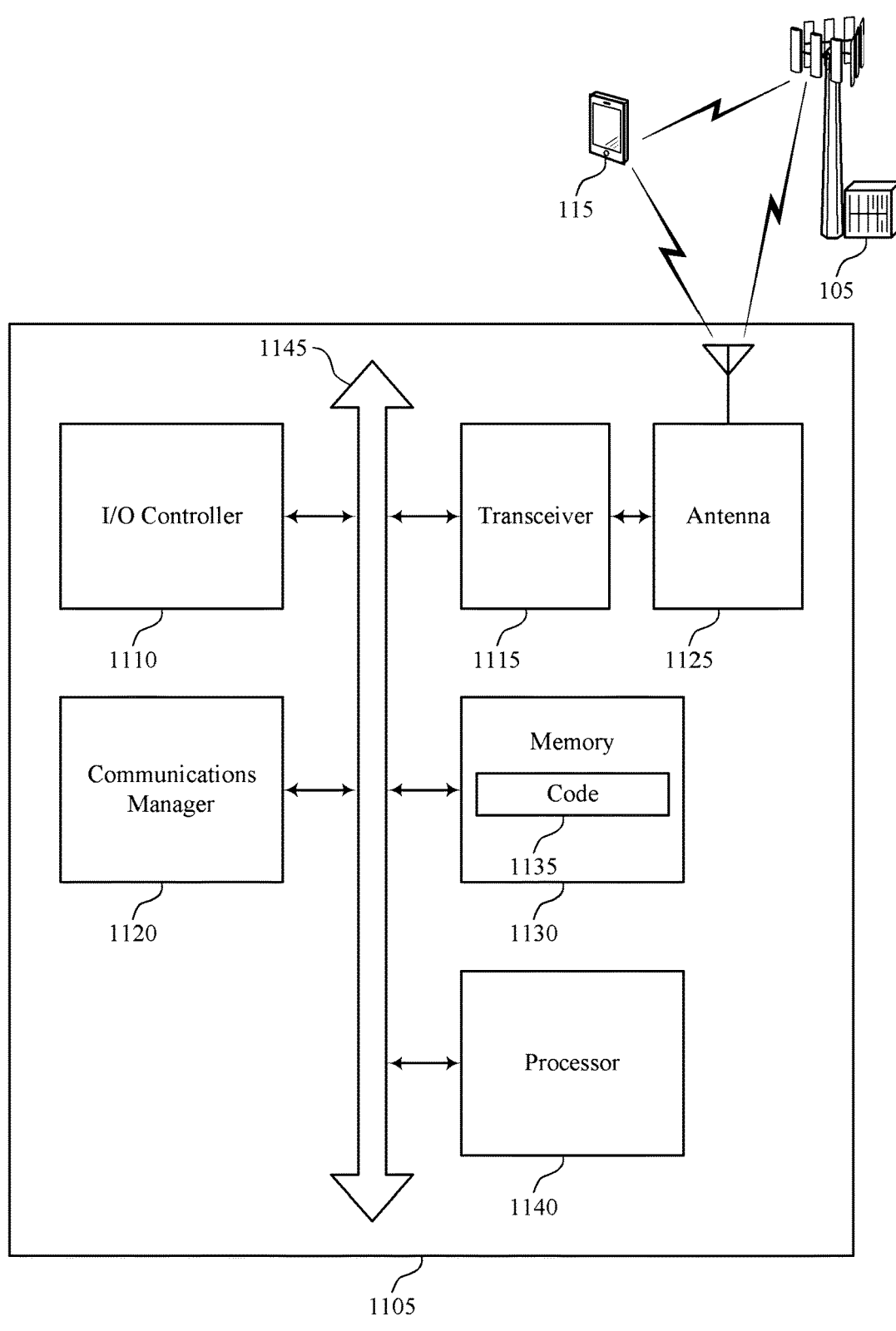
FIG. 11 shows a diagram of a system including a device that supports spatial domain transmission relation considerations for shared channel repetitions in accordance with aspects of the present disclosure.

FIG. 11 shows a diagram of a system 1100 including a device 1105 that supports spatial domain transmission relation considerations for shared channel repetitions in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting spatial domain transmission relation considerations for shared channel repetitions). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications for a UE in accordance with examples as disclosed herein. For example, the communications manager 1120 may be configured as or otherwise support a means for transmitting a random access channel preamble to a base station. The communications manager 1120 may be configured as or otherwise support a means for receiving, from the base station and in response to the random access channel preamble, a random access response message. The communications manager 1120 may be configured as or otherwise support a means for identifying a beam configuration for transmission of repetitions of an uplink transmission responsive to the random access response message. The communications manager 1120 may be configured as or otherwise support a means for transmitting the repetitions of the uplink transmission using one or more beams in accordance with the beam configuration.

By including or configuring the communications manager 1120 in accordance with examples as described herein, the device 1105 may support techniques for decreased interference and increased communications efficiency. The device 1105 may identify a beam configuration, which may indicate to the device 1105 whether to use a same or different beam for RACH message repetitions. The beam configuration may decrease interference, as the beam configuration may be based on an expected measure of interference or to establish transmit diversity.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of spatial domain transmission relation considerations for shared channel repetitions as described herein, or the processor 1140 and the memory 1130 may be otherwise configured to perform or support such operations.

Figure 12:
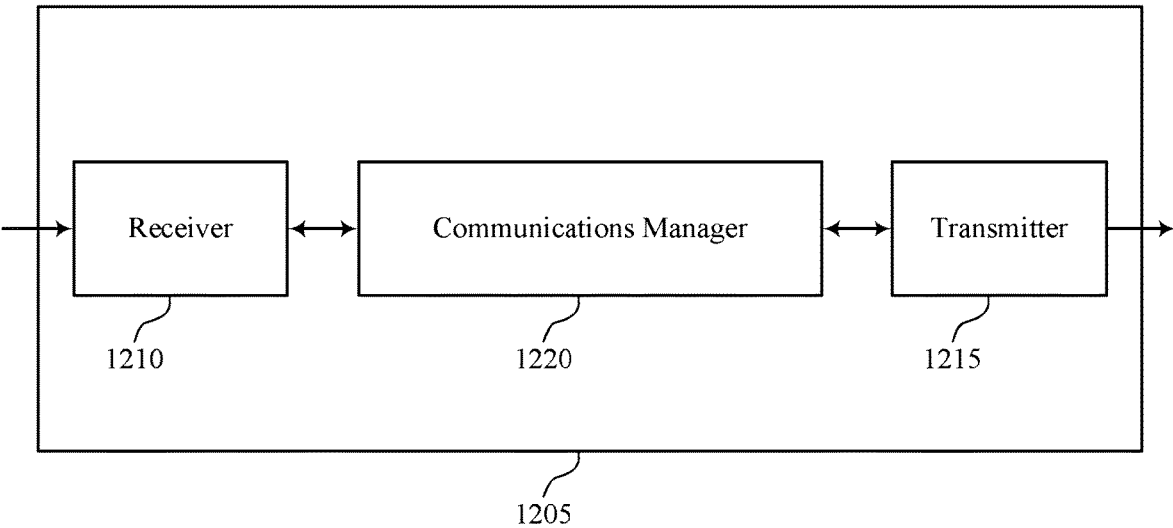
FIGS. 12 and 13 show block diagrams of devices that support spatial domain transmission relation considerations for shared channel repetitions in accordance with aspects of the present disclosure.

FIG. 12 shows a block diagram 1200 of a device 1205 that supports spatial domain transmission relation considerations for shared channel repetitions in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to spatial domain transmission relation considerations for shared channel repetitions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to spatial domain transmission relation considerations for shared channel repetitions). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of spatial domain transmission relation considerations for shared channel repetitions as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for receiving a random access channel preamble from a UE. The communications manager 1220 may be configured as or otherwise support a means for transmitting, to the UE and in response to the random access channel preamble, a random access response message. The communications manager 1220 may be configured as or otherwise support a means for transmitting an indication of a beam configuration for UE transmission of repetitions of an uplink transmission responsive to the random access response message. The communications manager 1220 may be configured as or otherwise support a means for receiving the repetitions of the uplink transmission from the UE in accordance with the beam configuration.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for decreasing communications inefficiency at a device 1205. The device 1205 may identify a beam configuration, which may indicate to the device 1205 whether to use a same or different beam for RACH message repetitions. The beam configuration may decrease interference, as the beam configuration may be based on an expected measure of interference or to establish transmit diversity.

Figure 13:
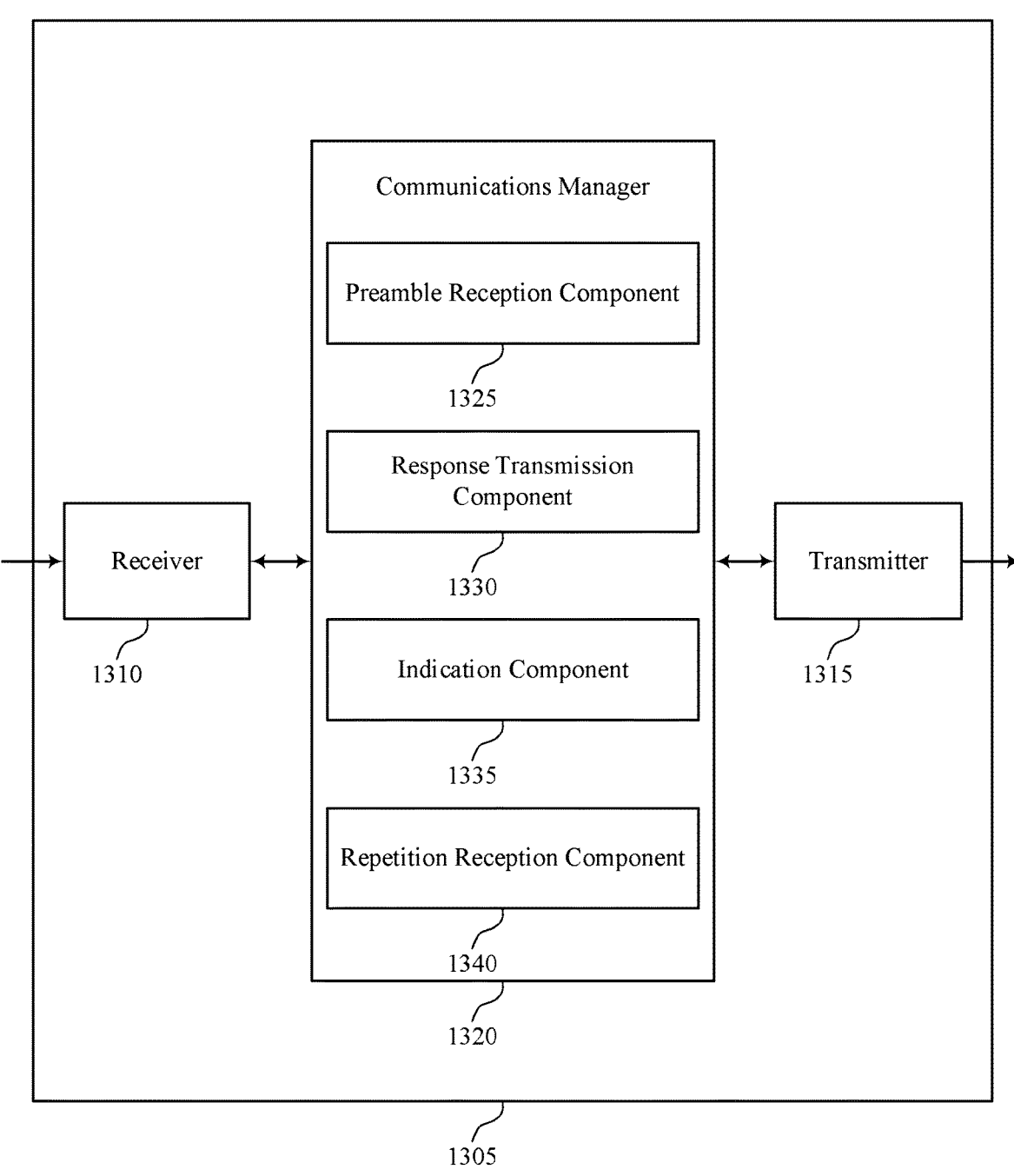

FIG. 13 shows a block diagram 1300 of a device 1305 that supports spatial domain transmission relation considerations for shared channel repetitions in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to spatial domain transmission relation considerations for shared channel repetitions). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to spatial domain transmission relation considerations for shared channel repetitions). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of spatial domain transmission relation considerations for shared channel repetitions as described herein. For example, the communications manager 1320 may include a preamble reception component 1325, a response transmission component 1330, an indication component 1335, a repetition reception component 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The preamble reception component 1325 may be configured as or otherwise support a means for receiving a random access channel preamble from a UE. The response transmission component 1330 may be configured as or otherwise support a means for transmitting, to the UE and in response to the random access channel preamble, a random access response message. The indication component 1335 may be configured as or otherwise support a means for transmitting an indication of a beam configuration for UE transmission of repetitions of an uplink transmission responsive to the random access response message. The repetition reception component 1340 may be configured as or otherwise support a means for receiving the repetitions of the uplink transmission from the UE in accordance with the beam configuration.

Figure 14:
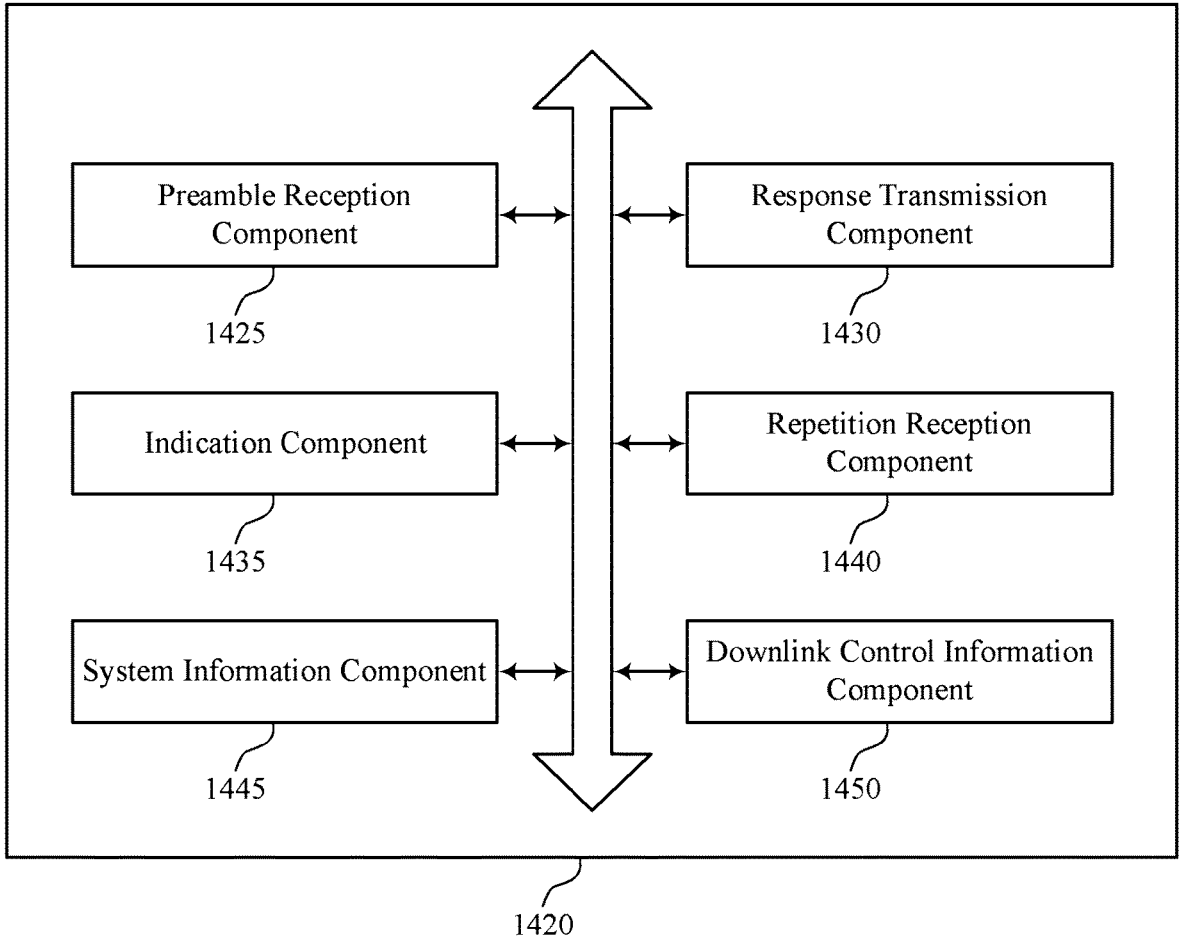
FIG. 14 shows a block diagram of a communications manager that supports spatial domain transmission relation considerations for shared channel repetitions in accordance with aspects of the present disclosure.

FIG. 14 shows a block diagram 1400 of a communications manager 1420 that supports spatial domain transmission relation considerations for shared channel repetitions in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of spatial domain transmission relation considerations for shared channel repetitions as described herein. For example, the communications manager 1420 may include a preamble reception component 1425, a response transmission component 1430, an indication component 1435, a repetition reception component 1440, a system information component 1445, a downlink control information component 1450, or any combination thereof. Each of these components may communicate, directly or indirectly, with one another (e.g., via one or more buses).

The communications manager 1420 may support wireless communications at a base station in accordance with examples as disclosed herein. The preamble reception component 1425 may be configured as or otherwise support a means for receiving a random access channel preamble from a UE. The response transmission component 1430 may be configured as or otherwise support a means for transmitting, to the UE and in response to the random access channel preamble, a random access response message. The indication component 1435 may be configured as or otherwise support a means for transmitting an indication of a beam configuration for UE transmission of repetitions of an uplink transmission responsive to the random access response message. The repetition reception component 1440 may be configured as or otherwise support a means for receiving the repetitions of the uplink transmission from the UE in accordance with the beam configuration.

In some examples, the beam configuration indicates that the repetitions are to be transmitted by the UE using a same beam for each repetition of the uplink transmission.

In some examples, the beam configuration indicates that the repetitions are to be transmitted by the UE using a different beam for each repetition of the uplink transmission.

In some examples, the uplink transmission includes an initial transmission of the uplink transmission responsive to the random access response message of a four-step random access procedure.

In some examples, the uplink transmission includes a retransmission of the uplink transmission responsive to the random access response message of a four-step random access procedure.

In some examples, the beam configuration indicates that the repetitions of the uplink transmission and the repetitions of the one or more retransmissions of the uplink transmission are to be transmitted by the UE using a same beam for respective repetitions within the uplink transmission and the one or more retransmissions of the uplink transmission.

In some examples, the beam configuration indicates that the repetitions of the uplink transmission and the repetitions of the one or more retransmissions of the uplink transmission are to be transmitted by the UE using a different beam for respective repetitions within the uplink transmission and the one or more retransmissions of the uplink transmission.

In some examples, to support transmitting the indication of the beam configuration, the response transmission component 1430 may be configured as or otherwise support a means for transmitting the indication of the beam configuration in the random access response message.

In some examples, to support transmitting the indication of the beam configuration, the system information component 1445 may be configured as or otherwise support a means for transmitting the indication of the beam configuration in a system information message.

In some examples, to support transmitting the indication of the beam configuration, the downlink control information component 1450 may be configured as or otherwise support a means for transmitting the indication of the beam configuration in a downlink control information message that includes a cyclic redundancy check scrambled by either a random access radio network temporary identifier or a temporary cell random access radio network temporary identifier.

In some examples, the repetitions of the uplink transmission are repeated using a same symbol allocation in consecutive slots.

Figure 15:
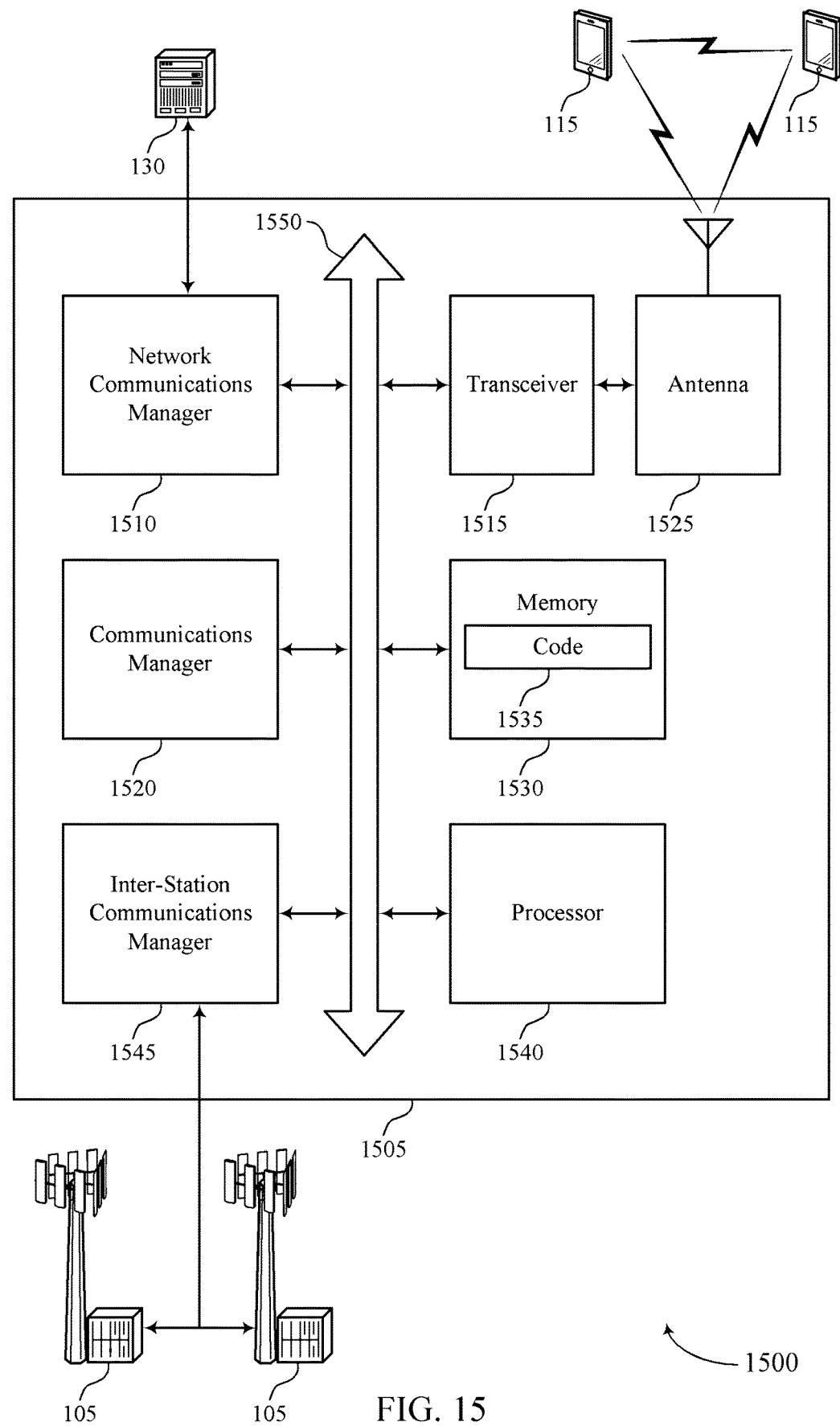
FIG. 15 shows a diagram of a system including a device that supports spatial domain transmission relation considerations for shared channel repetitions in accordance with aspects of the present disclosure.

FIG. 15 shows a diagram of a system 1500 including a device 1505 that supports spatial domain transmission relation considerations for shared channel repetitions in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting spatial domain transmission relation considerations for shared channel repetitions). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for receiving a random access channel preamble from a UE. The communications manager 1520 may be configured as or otherwise support a means for transmitting, to the UE and in response to the random access channel preamble, a random access response message. The communications manager 1520 may be configured as or otherwise support a means for transmitting an indication of a beam configuration for UE transmission of repetitions of an uplink transmission responsive to the random access response message. The communications manager 1520 may be configured as or otherwise support a means for receiving the repetitions of the uplink transmission from the UE in accordance with the beam configuration.

By including or configuring the communications manager 1520 in accordance with examples as described herein, the device 1505 may support techniques for improved beamforming communications. The device 1505 may identify a beam configuration, which may indicate to the device 1505 whether to use a same or different beam for RACH message repetitions. The beam configuration may decrease interference, as the beam configuration may be based on an expected measure of interference or to establish transmit diversity.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of spatial domain transmission relation considerations for shared channel repetitions as described herein, or the processor 1540 and the memory 1530 may be otherwise configured to perform or support such operations.

FIG. 16 shows a flowchart illustrating a method 1600 that supports spatial domain transmission relation considerations for shared channel repetitions in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include transmitting a random access channel preamble to a base station. The operations of 1605 may be performed in accordance with examples as disclosed herein. In some examples, aspects of the operations of 1605 may be performed by a preamble transmission component 1025 as described with reference to FIG. 10.

At 1610, the method may include receiving, from the base station and in response to the random access channel preamble, a random access response message. The operations of 1610 may be performed in accordance with examples as disclosed herein. In some examples, aspects of the operations of 1610 may be performed by a response reception component 1030 as described with reference to FIG. 10.

At 1615, the method may include identifying a beam configuration for transmission of repetitions of an uplink transmission responsive to the random access response message. The operations of 1615 may be performed in accordance with examples as disclosed herein. In some examples, aspects of the operations of 1615 may be performed by a beam configuration component 1035 as described with reference to FIG. 10.

At 1620, the method may include transmitting the repetitions of the uplink transmission using one or more beams in accordance with the beam configuration. The operations of 1620 may be performed in accordance with examples as disclosed herein. In some examples, aspects of the operations of 1620 may be performed by an uplink transmission component 1040 as described with reference to FIG. 10.

FIG. 17 shows a flowchart illustrating a method 1700 that supports spatial domain transmission relation considerations for shared channel repetitions in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include transmitting a random access channel preamble to a base station. The operations of 1705 may be performed in accordance with examples as disclosed herein. In some examples, aspects of the operations of 1705 may be performed by a preamble transmission component 1025 as described with reference to FIG. 10.

At 1710, the method may include receiving, from the base station and in response to the random access channel preamble, a random access response message. The operations of 1710 may be performed in accordance with examples as disclosed herein. In some examples, aspects of the operations of 1710 may be performed by a response reception component 1030 as described with reference to FIG. 10.

At 1715, the method may include identifying a beam configuration for transmission of repetitions of an uplink transmission responsive to the random access response message. The operations of 1715 may be performed in accordance with examples as disclosed herein. In some examples, aspects of the operations of 1715 may be performed by a beam configuration component 1035 as described with reference to FIG. 10.

At 1720, the method may include transmitting the repetitions of the uplink transmission using a same beam for each repetition of the uplink transmission, in accordance with the beam configuration. The operations of 1720 may be performed in accordance with examples as disclosed herein. In some examples, aspects of the operations of 1720 may be performed by an uplink transmission component 1040 as described with reference to FIG. 10.

Figure 18:
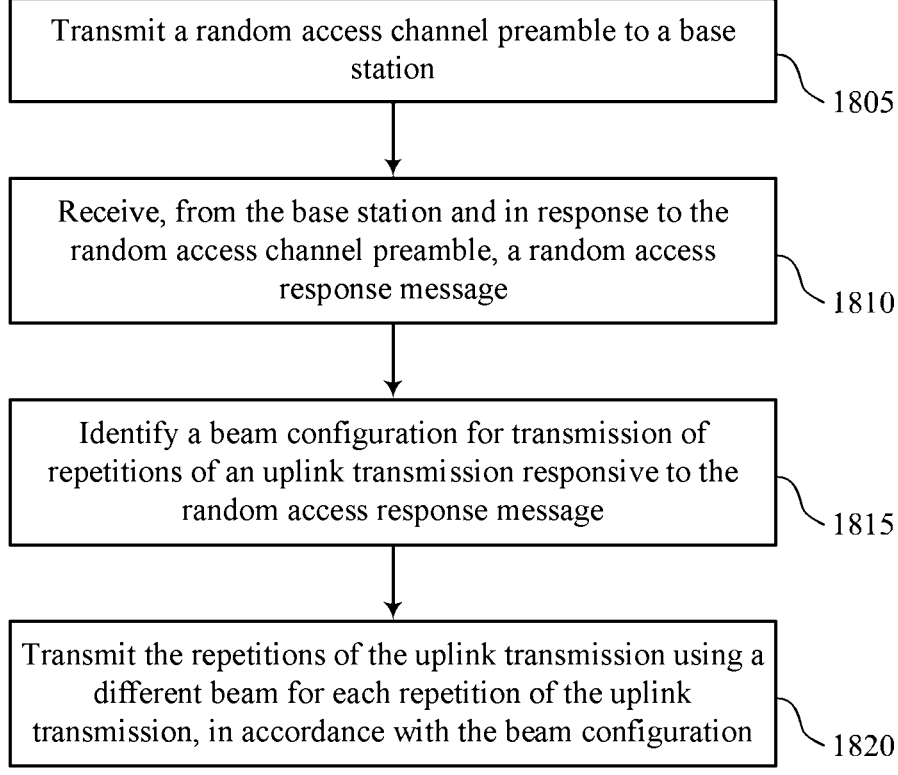

FIG. 18 shows a flowchart illustrating a method 1800 that supports spatial domain transmission relation considerations for shared channel repetitions in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include transmitting a random access channel preamble to a base station. The operations of 1805 may be performed in accordance with examples as disclosed herein. In some examples, aspects of the operations of 1805 may be performed by a preamble transmission component 1025 as described with reference to FIG. 10.

At 1810, the method may include receiving, from the base station and in response to the random access channel preamble, a random access response message. The operations of 1810 may be performed in accordance with examples as disclosed herein. In some examples, aspects of the operations of 1810 may be performed by a response reception component 1030 as described with reference to FIG. 10.

At 1815, the method may include identifying a beam configuration for transmission of repetitions of an uplink transmission responsive to the random access response message. The operations of 1815 may be performed in accordance with examples as disclosed herein. In some examples, aspects of the operations of 1815 may be performed by a beam configuration component 1035 as described with reference to FIG. 10.

At 1820, the method may include transmitting the repetitions of the uplink transmission using a different beam for each repetition of the uplink transmission, in accordance with the beam configuration. The operations of 1820 may be performed in accordance with examples as disclosed herein. In some examples, aspects of the operations of 1820 may be performed by an uplink transmission component 1040 as described with reference to FIG. 10.

FIG. 19 shows a flowchart illustrating a method 1900 that supports spatial domain transmission relation considerations for shared channel repetitions in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1905, the method may include transmitting a random access channel preamble to a base station. The operations of 1905 may be performed in accordance with examples as disclosed herein. In some examples, aspects of the operations of 1905 may be performed by a preamble transmission component 1025 as described with reference to FIG. 10.

At 1910, the method may include receiving, from the base station and in response to the random access channel preamble, a random access response message. The operations of 1910 may be performed in accordance with examples as disclosed herein. In some examples, aspects of the operations of 1910 may be performed by a response reception component 1030 as described with reference to FIG. 10.

At 1915, the method may include identifying a beam configuration for transmission of repetitions of an uplink transmission responsive to the random access response message. The operations of 1915 may be performed in accordance with examples as disclosed herein. In some examples, aspects of the operations of 1915 may be performed by a beam configuration component 1035 as described with reference to FIG. 10.

At 1920, the method may include transmitting the repetitions of the uplink transmission using one or more beams in accordance with the beam configuration. The operations of 1920 may be performed in accordance with examples as disclosed herein. In some examples, aspects of the operations of 1920 may be performed by an uplink transmission component 1040 as described with reference to FIG. 10.

At 1925, the method may include receiving an indication of the beam configuration in the random access response message. The operations of 1925 may be performed in accordance with examples as disclosed herein. In some examples, aspects of the operations of 1925 may be performed by a beam configuration indication component 1050 as described with reference to FIG. 10.

The following provides an overview of aspects of the present disclosure:

Aspect 1: A method for wireless communications for a UE, comprising: transmitting a random access channel preamble to a base station; receiving, from the base station and in response to the random access channel preamble, a random access response message; identifying a beam configuration for transmission of repetitions of an uplink transmission responsive to the random access response message; and transmitting the repetitions of the uplink transmission using one or more beams in accordance with the beam configuration.

Aspect 2: The method of aspect 1, wherein transmitting the repetitions of the uplink transmission comprises: transmitting the repetitions of the uplink transmission using a same beam for each repetition of the uplink transmission, in accordance with the beam configuration.

Aspect 3: The method of any of aspects 1 through 2, wherein transmitting the repetitions of the uplink transmission comprises: transmitting the repetitions of the uplink transmission using a different beam for each repetition of the uplink transmission, in accordance with the beam configuration.

Aspect 4: The method of any of aspects 1 through 3, wherein the uplink transmission comprises an initial transmission of the uplink transmission responsive to the random access response message of a four-step random access procedure.

Aspect 5: The method of any of aspects 1 through 4, wherein the uplink transmission comprises a retransmission of the uplink transmission responsive to the random access response message of a four-step random access procedure.

Aspect 6: The method of any of aspects 1 through 5, further comprising: transmitting repetitions of one or more retransmissions of the uplink transmission, wherein the repetitions of the uplink transmission and the repetitions of the one or more retransmissions of the uplink transmission are transmitted using same beams for respective repetitions within the uplink transmission and the one or more retransmissions of the uplink transmission, in accordance with the beam configuration.

Aspect 7: The method of any of aspects 1 through 6, further comprising: transmitting repetitions of one or more retransmissions of the uplink transmission, wherein the repetitions of the uplink transmission and the repetitions of the one or more retransmissions of the uplink transmission are transmitted using different beams for respective repetitions within the uplink transmission and the one or more retransmissions of the uplink transmission, in accordance with the beam configuration.

Aspect 8: The method of any of aspects 1 through 7, wherein identifying the beam configuration comprises: receiving an indication of the beam configuration in the random access response message.

Aspect 9: The method of any of aspects 1 through 8, wherein identifying the beam configuration comprises: receiving an indication of the beam configuration in a system information message.

Aspect 10: The method of any of aspects 1 through 9, wherein identifying the beam configuration comprises: receiving an indication of the beam configuration in a downlink control information message that includes a cyclic redundancy check scrambled by either a random access radio network temporary identifier or a temporary cell random access radio network temporary identifier.

Aspect 11: The method of any of aspects 1 through 10, wherein the one or more beams each correspond to a different spatial domain filter.

Aspect 12: The method of any of aspects 1 through 11, wherein the repetitions of the uplink transmission are repeated using a same symbol allocation in consecutive slots.

Aspect 13: A method for wireless communications at a base station, comprising: receiving a random access channel preamble from a UE; transmitting, to the UE and in response to the random access channel preamble, a random access response message; transmitting an indication of a beam configuration for UE transmission of repetitions of an uplink transmission responsive to the random access response message; and receiving the repetitions of the uplink transmission from the UE in accordance with the beam configuration.

Aspect 14: The method of aspect 13, wherein the beam configuration indicates that the repetitions are to be transmitted by the UE using a same beam for each repetition of the uplink transmission.

Aspect 15: The method of any of aspects 13 through 14, wherein the beam configuration indicates that the repetitions are to be transmitted by the UE using a different beam for each repetition of the uplink transmission.

Aspect 16: The method of any of aspects 13 through 15, wherein the uplink transmission comprises an initial transmission of the uplink transmission responsive to the random access response message of a four-step random access procedure.

Aspect 17: The method of any of aspects 13 through 16, wherein the uplink transmission comprises a retransmission of the uplink transmission responsive to the random access response message of a four-step random access procedure.

Aspect 18: The method of any of aspects 13 through 17, wherein the beam configuration indicates that the repetitions of the uplink transmission and the repetitions of the one or more retransmissions of the uplink transmission are to be transmitted by the UE using a same beam for respective repetitions within the uplink transmission and the one or more retransmissions of the uplink transmission.

Aspect 19: The method of any of aspects 13 through 18, wherein the beam configuration indicates that the repetitions of the uplink transmission and the repetitions of the one or more retransmissions of the uplink transmission are to be transmitted by the UE using a different beam for respective repetitions within the uplink transmission and the one or more retransmissions of the uplink transmission.

Aspect 20: The method of any of aspects 13 through 19, wherein transmitting the indication of the beam configuration comprises: transmitting the indication of the beam configuration in the random access response message.

Aspect 21: The method of any of aspects 13 through 20, wherein transmitting the indication of the beam configuration comprises: transmitting the indication of the beam configuration in a system information message.

Aspect 22: The method of any of aspects 13 through 21, wherein transmitting the indication of the beam configuration comprises: transmitting the indication of the beam configuration in a downlink control information message that includes a cyclic redundancy check scrambled by either a random access radio network temporary identifier or a temporary cell random access radio network temporary identifier.

Aspect 23: The method of any of aspects 13 through 22, wherein the repetitions of the uplink transmission are repeated using a same symbol allocation in consecutive slots.

Aspect 24: An apparatus for wireless communications for a UE, comprising a processor; memory coupled with the processor; and instructions stored in the memory and executable by the processor to cause the apparatus to perform a method of any of aspects 1 through 12.

Aspect 25: An apparatus for wireless communications for a UE, comprising at least one means for performing a method of any of aspects 1 through 12.

Aspect 26: A non-transitory computer-readable medium storing code for wireless communications for a UE, the code comprising instructions executable by a processor to perform a method of any of aspects 1 through 12.

Aspect 27: An apparatus for wireless communications at a base station, comprising a processor; memory coupled with the processor; and instructions stored in the memory and executable by the processor to cause the apparatus to perform a method of any of aspects 13 through 23.

Aspect 28: An apparatus for wireless communications at a base station, comprising at least one means for performing a method of any of aspects 13 through 23.

Aspect 29: A non-transitory computer-readable medium storing code for wireless communications at a base station, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications for a user equipment (UE), comprising:

transmitting a random access channel preamble to a network entity;

receiving, from the network entity and in response to the random access channel preamble, a random access response message;

identifying a beam configuration for transmission of repetitions of an uplink transmission responsive to the random access response message;

transmitting the repetitions of the uplink transmission using one or more beams in accordance with the beam configuration; and transmitting repetitions of one or more retransmissions of the uplink transmission, wherein the repetitions of the uplink transmission and the repetitions of the one or more retransmissions of the uplink transmission are transmitted using different beams for respective repetitions within the uplink transmission and the one or more retransmissions of the uplink transmission, in accordance with the beam configuration.

2. The method of claim 1, wherein transmitting the repetitions of the uplink transmission comprises:

transmitting the repetitions of the uplink transmission using a same beam for each repetition of the uplink transmission, in accordance with the beam configuration.

3. The method of claim 1, wherein transmitting the repetitions of the uplink transmission comprises:

transmitting the repetitions of the uplink transmission using a different beam for each repetition of the uplink transmission, in accordance with the beam configuration.

4. The method of claim 1, wherein the uplink transmission comprises an initial transmission of the uplink transmission responsive to the random access response message of a four-step random access procedure.

5. The method of claim 1, wherein the uplink transmission comprises a retransmission of the uplink transmission responsive to the random access response message of a four-step random access procedure.

6. The method of claim 1, wherein identifying the beam configuration comprises:

receiving an indication of the beam configuration in the random access response message.

7. The method of claim 1, wherein identifying the beam configuration comprises:

receiving an indication of the beam configuration in a system information message.

8. The method of claim 1, wherein identifying the beam configuration comprises:

receiving an indication of the beam configuration in a downlink control information message that includes a cyclic redundancy check scrambled by either a random access radio network temporary identifier or a temporary cell random access radio network temporary identifier.

9. The method of claim 1, wherein the one or more beams each correspond to a different spatial domain filter.

10. The method of claim 1, wherein the repetitions of the uplink transmission are repeated using a same symbol allocation in consecutive slots.

11. A method for wireless communications at a network entity, comprising:

receiving a random access channel preamble from a user equipment (UE);

transmitting, to the UE and in response to the random access channel preamble, a random access response message;

transmitting an indication of a beam configuration for UE transmission of repetitions of an uplink transmission responsive to the random access response message;

receiving the repetitions of the uplink transmission from the UE in accordance with the beam configuration; and receiving repetitions of one or more retransmissions of the uplink transmission, wherein the beam configuration indicates that the repetitions of the uplink transmission and the repetitions of the one or more retransmissions of the uplink transmission are to be transmitted by the UE using a different beam for respective repetitions within the uplink transmission and the one or more retransmissions of the uplink transmission.

12. The method of claim 11, wherein the beam configuration indicates that the repetitions are to be transmitted by the UE using a same beam for each repetition of the uplink transmission.

13. The method of claim 11, wherein the beam configuration indicates that the repetitions are to be transmitted by the UE using a different beam for each repetition of the uplink transmission.

14. The method of claim 11, wherein the uplink transmission comprises an initial transmission of the uplink transmission responsive to the random access response message of a four-step random access procedure.

15. The method of claim 11, wherein the uplink transmission comprises a retransmission of the uplink transmission responsive to the random access response message of a four-step random access procedure.

16. The method of claim 11, wherein transmitting the indication of the beam configuration comprises:

transmitting the indication of the beam configuration in the random access response message.

17. The method of claim 11, wherein transmitting the indication of the beam configuration comprises:

transmitting the indication of the beam configuration in a system information message.

18. The method of claim 11, wherein transmitting the indication of the beam configuration comprises:

transmitting the indication of the beam configuration in a downlink control information message that includes a cyclic redundancy check scrambled by either a random access radio network temporary identifier or a temporary cell random access radio network temporary identifier.

19. The method of claim 11, wherein the repetitions of the uplink transmission are repeated using a same symbol allocation in consecutive slots.

20. An apparatus for wireless communications for a user equipment (UE), comprising:

a processor;

memory coupled with the processor; and instructions stored in the memory and executable by the processor to cause the apparatus to:

transmit a random access channel preamble to a network entity;

receive, from the network entity and in response to the random access channel preamble, a random access response message;

identify a beam configuration for transmission of repetitions of an uplink transmission responsive to the random access response message;

transmit the repetitions of the uplink transmission using one or more beams in accordance with the beam configuration; and transmit repetitions of one or more retransmissions of the uplink transmission, wherein the repetitions of the uplink transmission and the repetitions of the one or more retransmissions of the uplink transmission are transmitted using different beams for respective repetitions within the uplink transmission and the one or more retransmissions of the uplink transmission, in accordance with the beam configuration.

21. The apparatus of claim 20, wherein the instructions to transmit the repetitions of the uplink transmission are executable by the processor to cause the apparatus to:

transmit the repetitions of the uplink transmission using a same beam for each repetition of the uplink transmission, in accordance with the beam configuration.

22. The apparatus of claim 20, wherein the instructions to transmit the repetitions of the uplink transmission are executable by the processor to cause the apparatus to:

transmit the repetitions of the uplink transmission using a different beam for each repetition of the uplink transmission, in accordance with the beam configuration.

23. The apparatus of claim 20, wherein the uplink transmission comprises an initial transmission of the uplink transmission responsive to the random access response message of a four-step random access procedure.

24. The apparatus of claim 20, wherein the uplink transmission comprises a retransmission of the uplink transmission responsive to the random access response message of a four-step random access procedure.

25. The apparatus of claim 20, wherein the instructions to identify the beam configuration are executable by the processor to cause the apparatus to:

receive an indication of the beam configuration in the random access response message.

26. The apparatus of claim 20, wherein the instructions to identify the beam configuration are executable by the processor to cause the apparatus to:

receive an indication of the beam configuration in a system information message.

27. The apparatus of claim 20, wherein the instructions to identify the beam configuration are executable by the processor to cause the apparatus to:

receive an indication of the beam configuration in a downlink control information message that includes a cyclic redundancy check scrambled by either a random access radio network temporary identifier or a temporary cell random access radio network temporary identifier.

28. The apparatus of claim 20, wherein the one or more beams each correspond to a different spatial domain filter.

29. The apparatus of claim 20, wherein the repetitions of the uplink transmission are repeated using a same symbol allocation in consecutive slots.

30. An apparatus for wireless communications at a network entity, comprising:

a processor;

memory coupled with the processor; and instructions stored in the memory and executable by the processor to cause the apparatus to:

receive a random access channel preamble from a user equipment (UE);

transmit, to the UE and in response to the random access channel preamble, a random access response message;

transmit an indication of a beam configuration for UE transmission of repetitions of an uplink transmission responsive to the random access response message;

receive the repetitions of the uplink transmission from the UE in accordance with the beam configuration; and receive repetitions of one or more retransmissions of the uplink transmission, wherein the beam configuration indicates that the repetitions of the uplink transmission and the repetitions of the one or more retransmissions of the uplink transmission are to be transmitted by the UE using a different beam for respective repetitions within the uplink transmission and the one or more retransmissions of the uplink transmission.

31. The apparatus of claim 30, wherein the beam configuration indicates that the repetitions are to be transmitted by the UE using a same beam for each repetition of the uplink transmission.

32. The apparatus of claim 30, wherein the beam configuration indicates that the repetitions are to be transmitted by the UE using a different beam for each repetition of the uplink transmission.

33. The apparatus of claim 30, wherein the uplink transmission comprises an initial transmission of the uplink transmission responsive to the random access response message of a four-step random access procedure.

34. The apparatus of claim 30, wherein the uplink transmission comprises a retransmission of the uplink transmission responsive to the random access response message of a four-step random access procedure.

35. The apparatus of claim 30, wherein the instructions to transmit the indication of the beam configuration are executable by the processor to cause the apparatus to:

transmit the indication of the beam configuration in the random access response message.

36. The apparatus of claim 30, wherein the instructions to transmit the indication of the beam configuration are executable by the processor to cause the apparatus to:

transmit the indication of the beam configuration in a system information message.

37. The apparatus of claim 30, wherein the instructions to transmit the indication of the beam configuration are executable by the processor to cause the apparatus to:

transmit the indication of the beam configuration in a downlink control information message that includes a cyclic redundancy check scrambled by either a random access radio network temporary identifier or a temporary cell random access radio network temporary identifier.

38. The apparatus of claim 30, wherein the repetitions of the uplink transmission are repeated using a same symbol allocation in consecutive slots.

39. An apparatus for wireless communications for a user equipment (UE), comprising:

means for transmitting a random access channel preamble to a network entity;

means for receiving, from the network entity and in response to the random access channel preamble, a random access response message;

means for identifying a beam configuration for transmission of repetitions of an uplink transmission responsive to the random access response message;

means for transmitting the repetitions of the uplink transmission using one or more beams in accordance with the beam configuration; and means for transmitting repetitions of one or more retransmissions of the uplink transmission, wherein the repetitions of the uplink transmission and the repetitions of the one or more retransmissions of the uplink transmission are transmitted using different beams for respective repetitions within the uplink transmission and the one or more retransmissions of the uplink transmission, in accordance with the beam configuration.

40. An apparatus for wireless communications at a network entity, comprising:

means for receiving a random access channel preamble from a user equipment (UE);

means for transmitting, to the UE and in response to the random access channel preamble, a random access response message;

means for transmitting an indication of a beam configuration for UE transmission of repetitions of an uplink transmission responsive to the random access response message;

means for receiving the repetitions of the uplink transmission from the UE in accordance with the beam configuration; and means for receiving repetitions of one or more retransmissions of the uplink transmission, wherein the beam configuration indicates that the repetitions of the uplink transmission and the repetitions of the one or more retransmissions of the uplink transmission are to be transmitted by the UE using a different beam for respective repetitions within the uplink transmission and the one or more retransmissions of the uplink transmission.

41. A non-transitory computer-readable medium storing code for wireless communications for a user equipment (UE), the code comprising instructions executable by a processor to:

transmit a random access channel preamble to a network entity;

receive, from the network entity and in response to the random access channel preamble, a random access response message;

identify a beam configuration for transmission of repetitions of an uplink transmission responsive to the random access response message;

transmit the repetitions of the uplink transmission using one or more beams in accordance with the beam configuration; and transmit repetitions of one or more retransmissions of the uplink transmission, wherein the repetitions of the uplink transmission and the repetitions of the one or more retransmissions of the uplink transmission are transmitted using different beams for respective repetitions within the uplink transmission and the one or more retransmissions of the uplink transmission, in accordance with the beam configuration.

42. A non-transitory computer-readable medium storing code for wireless communications at a network entity, the code comprising instructions executable by a processor to:

receive a random access channel preamble from a user equipment (UE);

transmit, to the UE and in response to the random access channel preamble, a random access response message;

transmit an indication of a beam configuration for UE transmission of repetitions of an uplink transmission responsive to the random access response message;

receive the repetitions of the uplink transmission from the UE in accordance with the beam configuration; and receive repetitions of one or more retransmissions of the uplink transmission, wherein the beam configuration indicates that the repetitions of the uplink transmission and the repetitions of the one or more retransmissions of the uplink transmission are to be transmitted by the UE using a different beam for respective repetitions within the uplink transmission and the one or more retransmissions of the uplink transmission.

* * * * *